US012551032B2

(12) United States Patent
Davis et al.

(10) Patent No.: US 12,551,032 B2
(45) Date of Patent: Feb. 17, 2026

(54) SHELVING UNIT

(71) Applicant: EAGLE INDUSTRIAL GROUP INC., Rancho Santa Margarita, CA (US)

(72) Inventors: Matthew Eaton Davis, Rancho Santa Margarita, CA (US); Noah Michael Rodebaugh, Lake Forest, CA (US); Dylan Tyler Ritchie, Carlsbad, CA (US)

(73) Assignee: KAPROCK MANAGEMENT LLC, Grapevine, TX (US)

( * ) Notice: Subject to any disclaimer, the term of this patent is extended or adjusted under 35 U.S.C. 154(b) by 0 days.

(21) Appl. No.: 18/747,143

(22) Filed: Jun. 18, 2024

(65) Prior Publication Data

US 2024/0398113 A1 Dec. 5, 2024

Related U.S. Application Data

(63) Continuation-in-part of application No. 29/751,874, filed on Sep. 23, 2020, now Pat. No. Des. 1,036,165.

(51) Int. Cl.
*A47F 7/28* (2006.01)
*A47B 47/02* (2006.01)
(Continued)

(52) U.S. Cl.
CPC ............. *A47F 7/28* (2013.01); *A47B 47/027* (2013.01); *A47B 57/06* (2013.01); *A47B 57/58* (2013.01); *A47B 83/001* (2013.01); *A47B 96/066* (2013.01)

(58) Field of Classification Search
CPC ......... A47F 7/28; A47B 47/027; A47B 57/06; A47B 57/58; A47B 83/001; A47B 96/066
See application file for complete search history.

(56) References Cited

U.S. PATENT DOCUMENTS

| 1,335,780 A | 4/1920 | Barton |
| 1,621,184 A | 3/1927 | White |

(Continued)

FOREIGN PATENT DOCUMENTS

| CN | 216089578 U | 3/2022 |
| EM | 000285507 | 1/2005 |

(Continued)

OTHER PUBLICATIONS

Ceiling SAM, Tote Slide Storage System, Jun. 26, 2020, youtube.com, accessed Oct. 4, 2023, www.youtube.com/watch?v=z_fN65V5IrE.

(Continued)

*Primary Examiner* — Stanton L Krycinski
(74) *Attorney, Agent, or Firm* — Definitive Patents, member Synchrony IP; Timothy D. Snowden; Yau H. Chan

(57) ABSTRACT

Apparatus and associated methods relate to a vertical shelving unit with transverse support members (SMs) (e.g., rails) supporting bins by their corresponding lips. The vertical shelving unit may, for example, include multiple vertical posts (VPs) defining a three-dimensional space. The VPs may, for example, include a set of SMs coupled to the VPs on opposing sides of the space. The SMs may, for example, be used to couple to the VPs on opposing sides of the space. For example, when a bin is inserted between the opposing sides, a protruding lip of the bin may be supported by the uppermost surface of the SMs. SMs may, for example, be shaped to follow a curvilinear path protruding into the space. SMs may, for example, include an upper SM connected by a truss structure to a lower SM. Various embodiments may advantageously provide a modular shelving unit that individually suspends storage bins.

22 Claims, 25 Drawing Sheets

(51) Int. Cl.
  *A47B 57/06* (2006.01)
  *A47B 57/58* (2006.01)
  *A47B 83/00* (2006.01)
  *A47B 96/06* (2006.01)

(56) References Cited

U.S. PATENT DOCUMENTS

| | | | |
|---|---|---|---|
| 2,936,077 A * | 5/1960 | Carpenter | A47B 57/485 |
| | | | 211/126.15 |
| 2,982,422 A * | 5/1961 | Asproyerakas | F16B 12/40 |
| | | | D34/21 |
| 3,124,402 A | 3/1964 | Rhoads | |
| 3,283,458 A | 11/1966 | Gersovitz | |
| 3,302,360 A | 2/1967 | Bjerking | |
| D213,151 S | 1/1969 | Groth | |
| 3,440,792 A | 4/1969 | Schmidgall | |
| 3,589,746 A * | 6/1971 | Inglis | A47B 57/12 |
| | | | 211/187 |
| 3,655,063 A | 4/1972 | Landry | |
| 3,693,311 A | 9/1972 | Bjerking | |
| 3,722,164 A | 3/1973 | Schmidgall | |
| 3,915,097 A * | 10/1975 | Young, Jr. | A47F 5/12 |
| | | | 211/187 |
| 3,963,125 A | 6/1976 | Baggott | |
| 3,977,529 A * | 8/1976 | Stroh | A47F 5/135 |
| | | | 108/189 |
| D241,297 S | 9/1976 | Maslow | |
| 4,004,819 A * | 1/1977 | Brongo | A21B 1/50 |
| | | | 211/181.1 |
| 4,013,173 A | 3/1977 | Snijders | A47B 96/06 |
| | | | 211/126.15 |
| 4,226,190 A * | 10/1980 | Ashton | A47F 5/13 |
| | | | 108/163 |
| D258,629 S | 3/1981 | Borzner | |
| 4,317,523 A | 3/1982 | Konstant | |
| 4,318,352 A * | 3/1982 | Friedman | A47B 57/265 |
| | | | 248/188 |
| 4,403,701 A | 9/1983 | Corcoran | |
| 4,725,066 A | 2/1988 | Nootenboom | |
| 4,795,040 A | 1/1989 | Lopez | |
| 4,887,538 A | 12/1989 | Arnold | |
| 4,988,003 A | 1/1991 | Spitzer | |
| 4,999,965 A | 3/1991 | Schmidgall | |
| 5,065,873 A | 11/1991 | Tseng | |
| D326,579 S * | 6/1992 | Leeds | D6/705.6 |
| 5,160,052 A | 11/1992 | Wudka | |
| 5,251,973 A | 10/1993 | Hazan | |
| 5,263,595 A * | 11/1993 | Hilstolsky | A47B 55/02 |
| | | | 211/126.15 |
| 5,390,803 A * | 2/1995 | McAllister | A47B 57/265 |
| | | | 211/187 |
| 5,407,084 A | 4/1995 | Remmers | |
| 5,409,122 A | 4/1995 | Lazarus | |
| 5,415,302 A * | 5/1995 | Carlson | A47B 57/265 |
| | | | 211/187 |
| D367,784 S | 3/1996 | Goetz | |
| 5,511,675 A | 4/1996 | Frederick | |
| 5,601,038 A | 2/1997 | Welch | |
| 5,605,238 A | 2/1997 | Jacobs | |
| D383,624 S | 9/1997 | Grosfillex | |
| D385,132 S | 10/1997 | Sagol | |
| D385,444 S | 10/1997 | Welch | |
| 5,706,741 A | 1/1998 | Thorp | |
| 5,718,441 A * | 2/1998 | Kern | B62B 3/16 |
| | | | 211/187 |
| 5,797,503 A | 8/1998 | Stevens | |
| 5,810,179 A | 9/1998 | Kleiman | |
| 5,832,690 A | 11/1998 | Kaines | |
| D405,988 S | 2/1999 | Wohlford | |
| 5,896,722 A | 4/1999 | Swenson | |
| 5,960,968 A | 10/1999 | Wang | |
| D424,836 S | 5/2000 | Kopala, Jr. | |
| 6,116,436 A * | 9/2000 | Ferrucci | G11B 33/0444 |
| 6,158,600 A * | 12/2000 | Ferrucci | A47F 5/13 |
| | | | 211/90.03 |
| 6,173,847 B1 | 1/2001 | Zellner, III | |
| D439,109 S * | 3/2001 | Pai | D7/334 |
| D441,254 S * | 5/2001 | Pai | D7/403 |
| 6,257,426 B1 * | 7/2001 | Masunaka | A47B 57/545 |
| | | | 211/187 |
| 6,402,167 B1 * | 6/2002 | Calleja | B62B 3/006 |
| | | | 280/47.35 |
| D459,938 S * | 7/2002 | Pai | D7/334 |
| 6,474,327 B1 | 11/2002 | Bossler | |
| D466,359 S * | 12/2002 | Bossler | D7/334 |
| D468,954 S * | 1/2003 | Pai | D7/334 |
| D471,033 S * | 3/2003 | Yamaguchi | D6/675.2 |
| D471,381 S * | 3/2003 | Yamaguchi | D6/675.2 |
| D476,189 S * | 6/2003 | Bossler | D7/334 |
| D476,812 S * | 7/2003 | Yamaguchi | D6/705.6 |
| D477,160 S | 7/2003 | Grosfillex | |
| 6,604,473 B2 | 8/2003 | Felsenthal | |
| 6,619,489 B2 | 9/2003 | Kessel | |
| 6,622,446 B1 | 9/2003 | Ziegler | |
| 6,655,105 B2 | 12/2003 | Swenson | |
| 6,659,294 B1 | 12/2003 | Simard | |
| 6,726,040 B1 | 4/2004 | Chen | |
| 6,732,662 B2 * | 5/2004 | Welch | F24C 15/16 |
| | | | 312/334.44 |
| 6,739,463 B2 | 5/2004 | Wishart | |
| D493,047 S | 7/2004 | Moon | |
| 6,817,478 B2 * | 11/2004 | Venegas, Jr. | A47B 83/001 |
| | | | 211/186 |
| D517,769 S * | 3/2006 | Post | D34/21 |
| D525,051 S | 7/2006 | Kuelbs | |
| D534,376 S | 1/2007 | Sparkowski | |
| D584,906 S * | 1/2009 | Vanderheyden | D6/675.5 |
| D592,897 S | 5/2009 | Welsch | |
| D602,712 S * | 10/2009 | Ho | D6/675.2 |
| D626,356 S * | 11/2010 | Ho | D6/675.2 |
| 7,857,329 B2 * | 12/2010 | Cai | A47B 31/00 |
| | | | 280/47.35 |
| 7,896,171 B2 | 3/2011 | Battaglia | |
| D636,550 S * | 4/2011 | Molayem | D34/21 |
| 7,926,667 B2 | 4/2011 | Ding | |
| D637,835 S * | 5/2011 | Molayem | D6/675.3 |
| D651,066 S | 12/2011 | Johnson, III | |
| D653,876 S * | 2/2012 | Snider | D6/675.5 |
| D655,550 S | 3/2012 | Mattsson | |
| D655,551 S | 3/2012 | Mattsson | |
| 8,267,261 B2 | 9/2012 | Vanderhoek | |
| 8,505,933 B2 * | 8/2013 | Bernard | B62B 3/006 |
| | | | 280/33.998 |
| 8,739,986 B2 | 6/2014 | Preidt | |
| D714,628 S | 10/2014 | Vitale, Jr. | |
| D721,904 S * | 2/2015 | Tsai | D6/675.5 |
| 9,004,300 B1 | 4/2015 | Morrell | |
| D736,014 S * | 8/2015 | Tsai | D6/675.2 |
| 9,097,010 B2 | 8/2015 | Larkin | |
| 9,131,773 B2 | 9/2015 | Tsai | |
| D747,837 S * | 1/2016 | Chang | D34/21 |
| 9,237,803 B2 * | 1/2016 | Kassanoff | A47B 47/05 |
| 9,247,834 B1 * | 2/2016 | Lucht | A47F 5/0018 |
| 9,254,036 B2 | 2/2016 | Yang | |
| 9,282,816 B2 | 3/2016 | Ahart | |
| D752,906 S | 4/2016 | Gunderson | |
| D753,420 S | 4/2016 | Cheng | |
| D753,421 S | 4/2016 | Cheng | |
| 9,307,833 B2 | 4/2016 | Rosen | |
| D776,391 S * | 1/2017 | Daniell | D34/21 |
| D783,320 S | 4/2017 | Merritt | |
| 9,622,574 B2 | 4/2017 | Kabacinski | |
| 9,661,920 B2 * | 5/2017 | Ahart | A47B 57/08 |
| 9,713,379 B1 | 7/2017 | Tsai | |
| D799,870 S | 10/2017 | Liss | |
| 9,986,825 B1 | 6/2018 | Lin | |
| D827,971 S | 9/2018 | Stubbs | |
| D835,438 S | 12/2018 | Jones | |
| 10,561,297 B2 | 2/2020 | Maslana | |
| 10,681,978 B2 | 6/2020 | Lim | |
| D891,606 S | 7/2020 | Baker | |
| 10,842,263 B1 | 11/2020 | Chen | |

(56) References Cited

U.S. PATENT DOCUMENTS

| | | | |
|---|---|---|---|
| D907,877 S * | 1/2021 | Chiao | D34/21 |
| D911,084 S * | 2/2021 | Sabounjian | D6/675.2 |
| 10,913,474 B1 * | 2/2021 | Chiao | A47B 1/04 |
| 10,980,344 B1 | 4/2021 | Yang | |
| D922,807 S | 6/2021 | Greenwood | |
| 11,019,921 B2 | 6/2021 | Liss | |
| D923,980 S | 7/2021 | Robins | |
| D924,609 S | 7/2021 | Robins | |
| 11,224,291 B1 | 1/2022 | Cheng | |
| 11,274,447 B2 | 3/2022 | Schmidgall | |
| D953,783 S * | 6/2022 | Kulagin | D6/675.1 |
| D957,783 S * | 7/2022 | Chiao | D34/21 |
| D967,465 S | 10/2022 | Rollins | |
| D969,525 S | 11/2022 | Liu | |
| D974,808 S | 1/2023 | Chen | |
| 11,583,080 B2 | 2/2023 | Chen | |
| D996,096 S | 8/2023 | Mctavish | |
| 11,771,240 B2 | 10/2023 | Lutz | |
| D1,004,345 S | 11/2023 | Tong | |
| D1,005,020 S | 11/2023 | Qiao | |
| D1,007,802 S | 12/2023 | Li | |
| D1,034,008 S | 7/2024 | Guo | |
| D1,036,165 S | 7/2024 | Ritchie | |
| D1,044,357 S | 10/2024 | Luo | |
| D1,064,488 S | 2/2025 | Liu | |
| D1,068,358 S | 4/2025 | Cheng | |
| D1,069,469 S | 4/2025 | Kuo | |
| D1,073,378 S | 5/2025 | Li | |
| D1,073,380 S | 5/2025 | Lu | |
| D1,075,380 S | 5/2025 | Cheng | |
| D1,081,215 S | 7/2025 | Ritchie | |
| 12,364,345 B2 | 7/2025 | Ritchie | |
| D1,090,134 S | 8/2025 | Pu | |
| 2003/0094884 A1 | 5/2003 | Sobol | |
| 2004/0256341 A1 | 12/2004 | Donnell | |
| 2006/0096938 A1 | 5/2006 | Kanou | |
| 2007/0095773 A1 | 5/2007 | Schwerman | |
| 2008/0185355 A1 | 8/2008 | Huang | |
| 2009/0045201 A1 | 2/2009 | Cheng | |
| 2009/0152225 A1 | 6/2009 | Lee | |
| 2009/0201102 A1 | 8/2009 | Oda | |
| 2011/0233162 A1 | 9/2011 | Kundinger, Jr. | |
| 2013/0063012 A1 | 3/2013 | Lu | |
| 2015/0289644 A1 | 10/2015 | Sabounjian | |
| 2016/0198847 A1 | 7/2016 | Fu | |
| 2017/0065078 A1 | 3/2017 | Sabounjian | |
| 2017/0208947 A1 * | 7/2017 | Tsai | A47B 57/50 |
| 2017/0211604 A1 * | 7/2017 | Tsai | A47B 96/061 |
| 2017/0215579 A1 | 8/2017 | Cooper | |
| 2018/0238058 A1 * | 8/2018 | Slaunwhite | A47F 5/12 |
| 2020/0031577 A1 | 1/2020 | Goren | |
| 2020/0138187 A1 * | 5/2020 | Lim | A47B 47/021 |
| 2020/0163455 A1 * | 5/2020 | Liss | A47B 47/028 |
| 2020/0214443 A1 * | 7/2020 | Cheng | A47B 47/021 |
| 2020/0352362 A1 | 11/2020 | Kaiser | |
| 2021/0188547 A1 | 6/2021 | Blotnik | |
| 2021/0188551 A1 | 6/2021 | Blotnik | |
| 2021/0371202 A1 | 12/2021 | Austrheim | |
| 2022/0287457 A1 | 9/2022 | Hanlon | |
| 2023/0012176 A1 | 1/2023 | Cheng | |
| 2023/0309694 A1 | 10/2023 | Tracy | |
| 2024/0335052 A1 | 10/2024 | Ritchie | |
| 2024/0398113 A1 | 12/2024 | Ritchie | |

FOREIGN PATENT DOCUMENTS

| | | |
|---|---|---|
| EM | 002418913 | 3/2014 |
| EM | 007701438 | 2/2020 |
| FR | 444368 A | 10/1912 |
| FR | 2350073 A2 | 12/1977 |
| FR | 2682861 A1 | 4/1993 |
| GB | 2301528 | 12/1996 |
| GB | 2589966 | 6/2021 |
| JP | 0580330 U | 11/1993 |
| WO | 2017178370 A1 | 10/2017 |

OTHER PUBLICATIONS

Dado Dad, Efficient Garage Storage: DIY Storage Rack with Floating Bins!, Apr. 24, 2021, YouTube, accessed Oct. 5, 2023, www.youtube.com/watch?v=gYX50-Vw9AQ.

Donnegan Systems, Secure Wire Carts, Secure Wire Carts, Donnegan Systems Inc., accessed Oct. 5, 2023, www.donnegan.com/secure-wire-carts/.

E-Z Garage, Tote Slide PRO Overhead Garage Storage Rack—Organize Up to 15 Storage Tote Container Bins on The Ceiling, Amazon.com, accessed Oct. 4, 2023, www.amazon.com/Overhead-Garage-Storage-Rack-Organize/dp/B0845L4K7Q/ref=sr_1_6?crid=1TI5JO33H56R&keywords=overhead+storage+bin&qid=1696450865&sprefix=overhead+storage+bin%2Caps%2C94&sr=8-6.

Garage Door Nation, Tote Slide, accessed Oct. 5, 2023, www.garagedoornation.com/products/tote-slide.

Gladiator, Flex Tall Cabinet Storage Basket, accessed Oct. 5, 2023, www.gladiatorgarageworks.com/products/flex-tall-cabinet-storage-basket.

Grainger, 1,200 lb Load Capacity, 12 Bins/Tubs, Steel Vertical Rack-Style Tub Cart, Grainger.com, accessed Oct. 5, 2023, www.grainger.com/product/DURHAM-MFG-Steel-Vertical-Rack-Style-16C866.

Hubert, Mobile Storage Cart with 6-Drawers Steel—24"L x 42"W x 33"H, Amazon.com, accessed Oct. 5, 2023, www.amazon.com/Mobile-Storage-Cart-6-Drawers-Steel/dp/B072L46G75?tag=namespacebran369-20.

Koova, Koova Wall Mounted Tote Rack Storage System, Fits 27-Gallon Black and Yellow Commander Style Bins, Wall Mount Bracket Shelves for Garage Organization, Heavy Duty Steel, Made in USA (3-Piece Set), Amazon.com, accessed Oct. 4, 2023, www.amazon.com/Koova-Mounted-27-Gallon-Commander-Organization/dp/B0BWFLYY7Z?source=ps-sl-shoppingads-lpcontext&ref_=fplfs&psc=1&smid=A36V129THKWMHL.

Koova, Overhead Storage Bin Rail System—Made in USA, accessed Oct. 5, 2023, www.koova.com/products/overhead-storage-bin-mount.

SafeRacks, SafeRacks Storage Bin Rack, 5 Tote Capacity, NSF Certified, costco.com, accessed Oct. 4, 2023, www.costco.com/saferacks-storage-bin-rack.product.100677580.html.

Uline, 7 Bin Restocking Cart—20 x 15 x 6, accessed Oct. 4, 2023, www.uline.com/Product/Detail/H-7028BLU/Bin-Carts/7-Bin-Restocking-Cart-20-x-15-x-6-Blue-Bins.

Uline, Wire Shelf Bin Organizer—36 x 12 x 72" with 7 x 12 x 4" Black Bins, accessed Oct. 4, 2023, www.uline.com/Product/Detail/H-8477BL/Bin-Organizers/Wire-Shelf-Bin-Organizer-36-x-12-x-72-with-7-x-12-x-4-Black-Bins.

Uline, Wire Shelving Bin Slides, accessed Oct. 4, 2023, www.uline.com/BL_3835/Wire-Shelving-Bin-Slides.

Uline, Wire Shelving Multi-Bin Slide—For 18" Deep Wire Shelving, accessed Oct. 4, 2023, www.uline.com/BL_3835/Wire-Shelving-Bin-Slides.

Fabric. "Fabric Launches World's Smallest Fulfillment Center for Profitable 1-Hour Deliveries." YouTube.com Oct. 11, 2018. Retrieved Sep. 12, 2025 from https://www.youtube.com/watch?v=LyUu1W_SZh0&t=13s (pp. 1-6).

Unknown Author. "Fabric Awarded New Patent Delivering Unparalleled Flexibility in Warehouse Storage Optimization." BusinessWire. Retrieved Sep. 12, 2025 from https://www.businesswire.com/news/home/20240110364131/en/Fabric-Awarded-New-Patent-Delivering-Unparalleled-Flexibility-in-Warehouse-Storage-Optimization (pp. 1-7).

Protrend Group. Unsolicited CAD drawing emailed to co-inventor on Feb. 10, 2025. No Known Publication. 8 pages.

Costco Reviewers, SafeRacks Storage Bin Rack, 5 Tote Capacity, NSF Certified (Costco.com), Reviews captured as of Feb. 12, 2025, Selected reviews retrieved from: costco.com/saferacks-storage-bin-rack-5-tote-capacity-nsf-certified.product.100677580.html.

Trinity, Trinity 5-Tier NSF Storage Bin Rack, retrieved from https://www.costco.ca/trinity-5-tier-nsf-storage-bin-rack.product .4000319394.html on May 22, 2025 (Year: 2025) (pp. 1-5).

Office Action (Notice of Allowance and Fees Due (PTOL-85)) dated Jun. 3, 2025 for U.S. Appl. No. 18/894,194 (pp. 1-8).

(56) References Cited

OTHER PUBLICATIONS

SafeRacks 5-Tier Steel Tote Rack WS-BR27. SafeRacks (online) 6 pgs. Available Jul. 21, 2023. [Retrieved Sep. 17, 2025] https://www.amazon.ca/5-Tier-Steel-Storage-Bin-Rack/dp/B08ZJRXNT7 (Year: 2023).

Costco. Gorilla Rack 5-tier Rolling Bin Organizer. Retrieved Aug. 5, 2025 from https://www.costco.com/gorilla-rack-5-tier-rolling-bin-organizer.product.4000342839.html.

American Van, Self-Stacking Bulk Storage Bin Rack, retrieved from https://web.archive.org/web/20100708010918/ http://www.americanvan.com/self-stacking-bulk-storage-bin-rack.html capture dated Jul. 8, 2010.

Buildplansco, Complete Garage Storage Solutions Kit: Shelving, Bins, and Rack Systems (18 gallon) (Etsy.com), retrieved from www.etsy.com/listing/1711296836/complete-garage-storage-solutions-kit on Apr. 1, 2025.

Cisco-Eagle, Vertical Stacking Rack w/ 6 Steel Stacking Bins (24"L x 15"W x 11"H), retrieved from https://www.cisco-eagle.com/product/170148/vertical-stacking-rack-w-6-steel-stacking-bins-24l-x-15w-x-11h on Apr. 15, 2025.

Diycraftcentral, Tote rack with 3 tier Shelf PDF | 27 Gallon Storage plan DIY garage shelves DIY bin shelf Garage storage Bin rack storage Workshop Storage (Etsy.com), retrieved from https://www.etsy.com/listing/1831427055/tote-rack-with-3-tier-shelf-pdf-27 on Apr. 1, 2025.

Joyful. Joyful Cargo 4 Multipurpose Storage System Cream (Amazon.ae), listing dated May 7, 2019, retrieved from https://www.amazon.ae/JOYFUL-Cargo-Multipurpose-Storage-System/dp/B07GTLCH7M?th=1 on Apr. 15, 2025.

Office Action (Final Rejection) dated Apr. 2, 2025 for U.S. Appl. No. 18/894,194 (pp. 1-15).

Office Action (Non-Final Rejection) dated Apr. 4, 2025 for U.S. Appl. No. 18/748,000 (pp. 1-15).

Proslat, Proslat Bin Warehouse Rack—12 Totes (Amazon.com), listing dated Jul. 2, 2020, retrieved from https://www.amazon.com/Proslat-Bin-Warehouse-Rack-Totes/dp/B08C81DZWX on Apr. 15, 2025.

Seville Classics, Stackable 3-Tier Sliding Double Basket Cabinet Organizer /w Bonus Liners, code at footer indicates possible date of Aug. 2017, retrieved from https://images-na.ssl-images-amazon.com/images/I/A1DxO4h355S.pdf on Apr. 16, 2025.

Theshelfdude, 27 Gal Storage Shelf Plans—SIDEWAYS Trendy Garage Storage Bin, Tote Storage Shelves, Garage Shelf Plans, Digital PDF Plans (Etsy.com), retrieved from https://www.etsy.com/listing/1783115432/27-gal-storage-shelf-plans-sideways on Apr. 1, 2025.

Theshelfdude, All Plans in One—Mobile Garage Storage Rack Plans/ All sizes included, Trendy Garage Storage Bin, Tote Storage Shelves, Digital PDF Plans (Etsy.com), retrieved from www.etsy.com/listing/1783130240/all-plans-in-one-mobile-garage-storage on Apr. 1, 2025.

Theshelfdude, Mobile Storage Bin for Garage Kit / 27 Gallon Shelf on Wheels / Trendy Bins Storage / Storage Rack for 27 Gal Totes with Caster Wheels Kit (Etsy.com), retrieved from https://www.etsy.com/listing/1681162073/mobile-storage-bin-for-garage-kit-27 on Mar. 17, 2025.

Wowoplans, Rolling Garage Storage Rack Plans | 1x5 Garage Storage | 27 Gallon Tote Organizer | Digital Download (Etsy.com), retrieved from https://www.etsy.com/uk/listing/1817847221/rolling-garage-storage-rack-plans-1x5?external=1&rec_type=cs&ref=landingpage_similar_listing_top-6&pro=1&logging_key=0382ddefacd581ccaf1a02940143ea9f4f830949:1817847221 on Mar. 17, 2025.

Lowes. Project Source 5-Tier Black Metal Storage bin rack with Wire Shelves. First discovered Dec. 2, 2025. Retrieved Dec. 3, 2025 from https://www.lowes.com/pd/Style-Selections-5-Tier-Black-Steel-Storage-bin-rack-23-3-in-W-x-31-4-in-D-x-68-in-H/5016311481 , 9 pages.

Notice of Allowance dated Sep. 17, 2025 for U.S. Appl. No. 29/951,838 (pp. 1-6).

Notice of Allowance dated Oct. 14, 2025 for U.S. Appl. No. 29/951,838 (pp. 1-2).

Office Action (Final Rejection) dated Nov. 25, 2025 for U.S. Appl. No. 18/748,000 (pp. 1-6).

Office Action dated Oct. 15, 2025 for U.S. Appl. No. 29/999,598 (pp. 1-4).

Trinity. EcoStorage® 2-Bag Bamboo Laundry Station. Retrieved Dec. 3, 2025 from https://trinityii.com/collections/bed-bath-laundry/products/trinity-ecostorage%C2%AE-2-bag-bamboo-laundry-station-dark-gray, 3 pages.

\* cited by examiner

1100

SHELVING UNIT

CROSS-REFERENCE TO RELATED APPLICATIONS

This application is a continuation in part and claims the benefit of U.S. application Ser. No. 29/751,874, titled "Shelving unit," filed by Dylan T. Ritchie on Sep. 23, 2020 and issued as U.S. Design Pat. D1,036,165 on Jul. 23, 2024.

This application incorporates the entire contents of the foregoing applications herein by reference.

TECHNICAL FIELD

Various embodiments relate generally to shelving.

BACKGROUND

Shelving is a versatile storage solution available in various types, including wall-mounted, freestanding, adjustable, and fixed. Materials used for shelving range from wood, metal, and plastic to glass, each offering some benefits. Shelving parameters may, for example, be used to select types and material based on intended use, load capacity, and environmental conditions. Differing installation and maintenance procedures may, for example, be used for different stability and longevity requirements.

SUMMARY

Apparatus and associated methods relate to a vertical shelving unit with transverse support members (SMs) (e.g., rails) slidingly supporting bins by their corresponding lips. The vertical shelving unit may, for example, include multiple vertical posts (VPs) defining a three-dimensional space. The VPs may, for example, include a set of SM(s) coupled to the VPs on opposing sides of the space. The SMs may, for example, be used to couple to the VPs on opposing sides of the space. For example, when a bin is inserted between the opposing sides, a protruding lip of the bin may be supported by the upper most surface of the SMs. SMs may, for example, be shaped to follow a curvilinear path protruding into the shelving space. SMs may, for example, include an upper SM connected by a truss structure to a lower SM. Various embodiments may advantageously provide a modular shelving unit that individually suspends storage bins.

In some embodiments, the upper horizontal member may, for example, include a horizontal area wherein the height is greater than the width to follow a curvilinear path front, inward, and out to a periphery. In some embodiments the shelves may, for example, include a horizontal back strap to limit backward travel of bins. In some embodiments, the shelving may, for example, include an adjustable length divider. Some shelving embodiments may, for example, include rails. Some shelving embodiments may, for example, include plastic slider mechanisms. Some shelving embodiments may, for example, include a plastic circular vertical post and a bent truss rail. The truss rail may, for example, be made of metal. Plastic may, for example, be extruded. The shelving embodiment may, for example, include two collars. Some embodiments may, for example, be injection molded.

In some embodiments, the adjustable free-standing shelving unit may, for example, be tailored for use with standard storage bins, offering ease of assembly combined with robustness appropriate for commercial or heavy-duty consumer applications. The shelving unit may, for example, feature parallel horizontal bin support beams on each side, configured to hold one or more standard storage bins. These bins are typically four-sided with an upper lip that facilitates the secure attachment of lids. The parallel horizontal bin supports form two rails, permitting storage bins to slide horizontally over the side rails, thus supporting the upper lip of each bin. Additionally, extra storage bins may be accommodated by wire decks that form the top and bottom of the unit. This configuration eliminates the need for supporting the bins with traditional shelves, which may reduce the overall cost of the storage unit compared to conventional shelving systems.

Some embodiments may include a bin rack. The bin rack may, for example, optimize storage without the need to down-stack bins. The rack supports bins from their side rails. The rack supports may, for example, allow easy access to bin lids while on the rack. The construction may, for example, be both durable and minimalist, reducing overall weight, which enhances usability and mobility in various storage environments.

Some embodiments may include a bin rack doubler. The bin rack doubler may, for example, enable users to combine or expand their existing bin racks into a space-saving assembly. The bin rack doubler may, for example, feature a tie support that attaches to the adjacent unit using a bolted clamp mechanism, promoting an integrated and robust configuration suitable for expanding storage capacity without sacrificing floor space.

Some embodiments may include a bin rack doubler kit. The bin rack doubler kit may, for example, include a custom wire shelf with post mounts and utilizes two S-hooks for attachment. This kit may, for example, include multiple components such as bin rack posts, extender shelves, doubler center supports, and additional sleeves, feet, and caps, providing a comprehensive solution for modular storage expansion.

Some embodiments may include a bin rack doubler with an extension shelf. The shelf hooks may, for example, be integrated directly into the structural member of the shelf itself. Integration may, for example, eliminate the need for S-hooks, simplifying the assembly and enhancing the structural integrity of the storage system.

Some embodiments may, for example, include a bin workbench and/or cart that features a hardwood work surface and accommodates up to four bins. The bin workbench and/or cart may, for example, be configured for easy assembly with threaded and friction-fit components, and large casters are included to enhance workspace flexibility, allowing for easy mobility across different working environments.

Some embodiments may include a bin workbench mount that screws into standard 1" wire rack support tubing. The mount flange features multiple slots that may, for example, be used for adjustability. The mount may, for example, be unscrewed to allow for precision leveling of the worktop, providing a stable and customizable workspace setup.

Some embodiments may include a workspace mount for bin racks where the wooden workspace needs to be securely mounted between two bin racks. The configuration allows for easy height adjustment of the worktop by attaching the workspace mount to the wood slab, facilitating ergonomic and practical workspace configurations.

Some embodiments may include a bin rack rail/shelf combination using rails that are attached directly to the shelf above, reducing the overall number of components and increasing rigidity. This configuration enhances the structural stability and load-bearing capacity of the storage system.

Some embodiments may include a double bin rack with suspended center rails that may not require center posts. This configuration uses a tie-support to suspend the shared middle rail, which facilitates the hanging of bins underneath standard wire shelves, maximizing the use of vertical space while maintaining easy accessibility to stored items.

Some embodiments may include a small bin rack with suspended rails. For example, some such embodiments may be configured for storing 5-gallon sized small bins. Some embodiments may be configured for small bins less than or greater than 5 gallons.

In some implementations, bins may, for example, be suspended with shared rails. These suspended rails are adjustable and may be moved to fit different-sized bins or directly fitted to the underside of standard wire shelves. This configuration allows for efficient use of vertical space and provides flexible storage solutions that may adapt to various bin sizes and storage needs, enhancing the organization and accessibility within a workspace.

Various embodiments may achieve one or more advantages. For example, some embodiments enhance structural stability and storage efficiency. The vertical shelving unit includes multiple vertical posts coupled with horizontal support members on opposing sides, forming a robust framework that may securely support bins and other storage items. The connection of the upper horizontal support member to a lower horizontal member via a truss structure further increases the structural integrity, allowing the shelving unit to handle heavier loads and resist bending or sagging under the weight of bins.

Various embodiments may achieve one or more advantages. For example, some embodiments offer adjustable storage solutions and improved usability. The upper horizontal member's curvilinear path accommodates different-sized bins, ensuring they remain securely in place. The inclusion of a horizontal back strap prevents bins from sliding backward, enhancing user safety and item security. Adjustable length dividers may, for example, provide flexibility, allowing users to customize storage spaces based on their needs. Additional features like rails and plastic sliding mechanisms may, for example, advantageously improve the functionality and ease of use of the shelving unit. Different manufacturing methods (e.g., injection molding, extrusion) may, for example, provide durability and/or a high-quality finish. The use of a bent truss rail (e.g., metal) may, for example, advantageously provide further reinforcement, which may, for example, enhance the overall resilience of the shelving system.

Various embodiments may achieve one or more advantages. For example, some embodiments enhance storage efficiency and accessibility. The Bin Rack embodiment may, for example, support bins from their side rails, enabling the storage of bins without the need to stack multiple bins directly on top of each other. This configuration may, for example, advantageously save space and/or facilitate ease of access to bin lids while on the rack. Such embodiments may, for example, advantageously enhance usability in environments where quick and frequent access to stored items is necessary.

Various embodiments may achieve one or more advantages. For example, some embodiments may allow for customizable and expandable storage configurations. The bin rack doubler embodiment may, for example, enable users to combine or expand their existing bin racks into a space-saving assembly. Embodiments having a tie support that attaches to the adjacent unit with a bolted clamp mechanism may, by way of example and not limitation, advantageously provide robust and integrated storage solutions that may adapt to changing storage needs.

For example, some embodiments may offer modular expansion capabilities. The bin rack doubler kit may, for example, include components such as bin rack posts, extender shelves, and/or doubler center supports. Such kits may, for example, advantageously collectively enable users to easily expand their storage capacity in a cohesive manner, which may, for example, promote greater organization and/or space utilization in varied environments.

For example, some embodiments simplify assembly and/or increase structural integrity. In some implementations, for example, an embodiment of the bin rack doubler may incorporate shelf hooks directly into a structural member of the shelf itself. Integrated shelf hooks may, for example, advantageously reduce or eliminate a need for S-hooks. Such embodiments may, for example, advantageously simplify the assembly process. An integrated approach may, for example, advantageously enhance the durability and stability of the storage system.

Various embodiments may achieve one or more advantages. For example, some embodiments enhance mobility and flexibility in workspace environments. The bin cart embodiment, may, for example, include a hardwood work surface and large casters. These features may, for example, allow for easy movement and reconfiguration of the workspace, supporting dynamic and versatile work environments.

Various embodiments may achieve one or more advantages. For example, some embodiments optimize workspace integration and storage. The bin rack workspace embodiment may, for example, include an adjustable hardwood work surface and is compatible with existing bin racks, utilizing S-hooks and an existing wire shelf for additional storage. This setup may, for example, allow for a functional workspace that integrates storage and work areas efficiently.

Various embodiments may achieve one or more advantages. For example, some embodiments provide adjustable and stable workspace setups. The workspace mount for bin racks embodiment facilitates easy adjustment of the worktop's height by securely mounting the wooden workspace between two bin racks. This feature allows for ergonomic customization and enhanced stability of the work surface.

Various embodiments may achieve one or more advantages. For example, some embodiments reduce component count and increase rigidity. The bin rack rail/shelf combination embodiment, which attaches bins directly to the shelf above without standard sliding rails, decreases the number of necessary components while enhancing the structural rigidity of the rack, beneficial in environments requiring robust storage solutions.

Various embodiments may achieve one or more advantages. For example, some embodiments maximize vertical storage space and improve accessibility. The double bin rack with suspended center rails embodiment uses a tie-support to suspend a shared middle rail, facilitating the hanging of bins and optimizing the use of overhead space. This setup enhances accessibility and efficiency in utilizing vertical spaces.

Various embodiments may achieve one or more advantages. For example, some embodiments may enhance adjustability and space efficiency. The small bin rack with suspended rails embodiment may, for example, be configured to hold small bins such as 5-gallon containers. The embodiment may, for example, include adjustable rails that may be adjusted to fit different-sized bins and/or fitted to the underside of standard wire shelves. This flexibility improves the use of space and adaptability to various storage needs.

Various embodiments may achieve one or more advantages. For example, some embodiments provide enhanced storage density and ease of access. The double bin rack with suspended center rails embodiment eliminates the need for center posts and utilizes a tie-support system to suspend bins, increasing the storage capacity and ease of access within compact spaces.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 2:
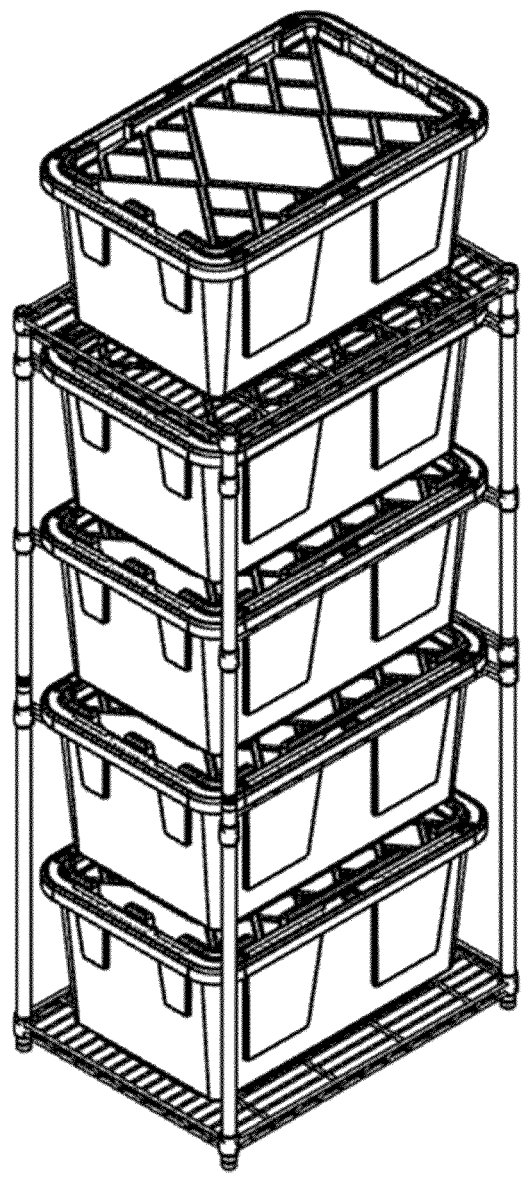
FIG. 2 depicts a perspective view exemplary vertical shelving unit.
Figure 3:
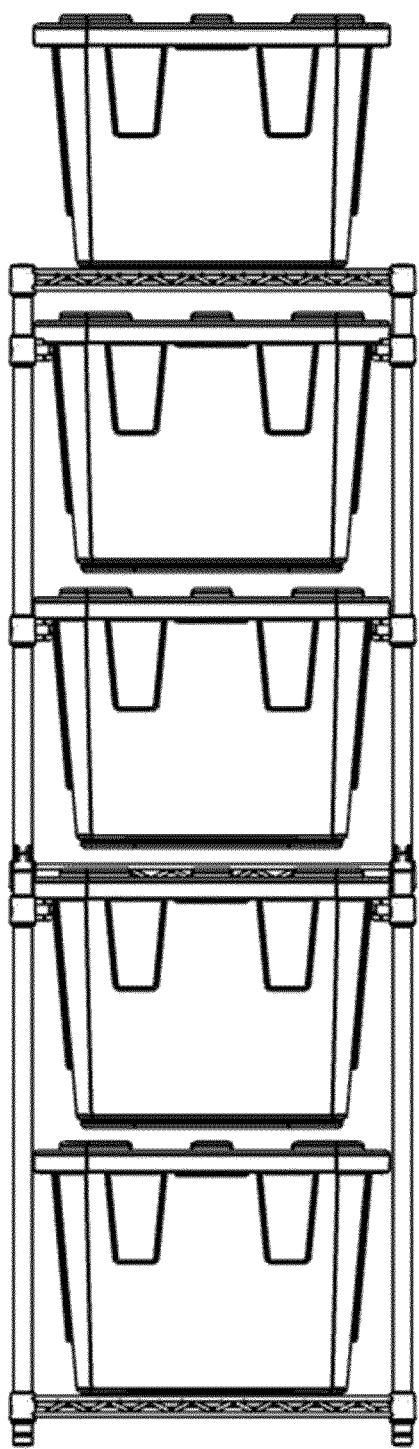
FIG. 3 depicts a front view exemplary vertical shelving unit.
Figure 4:
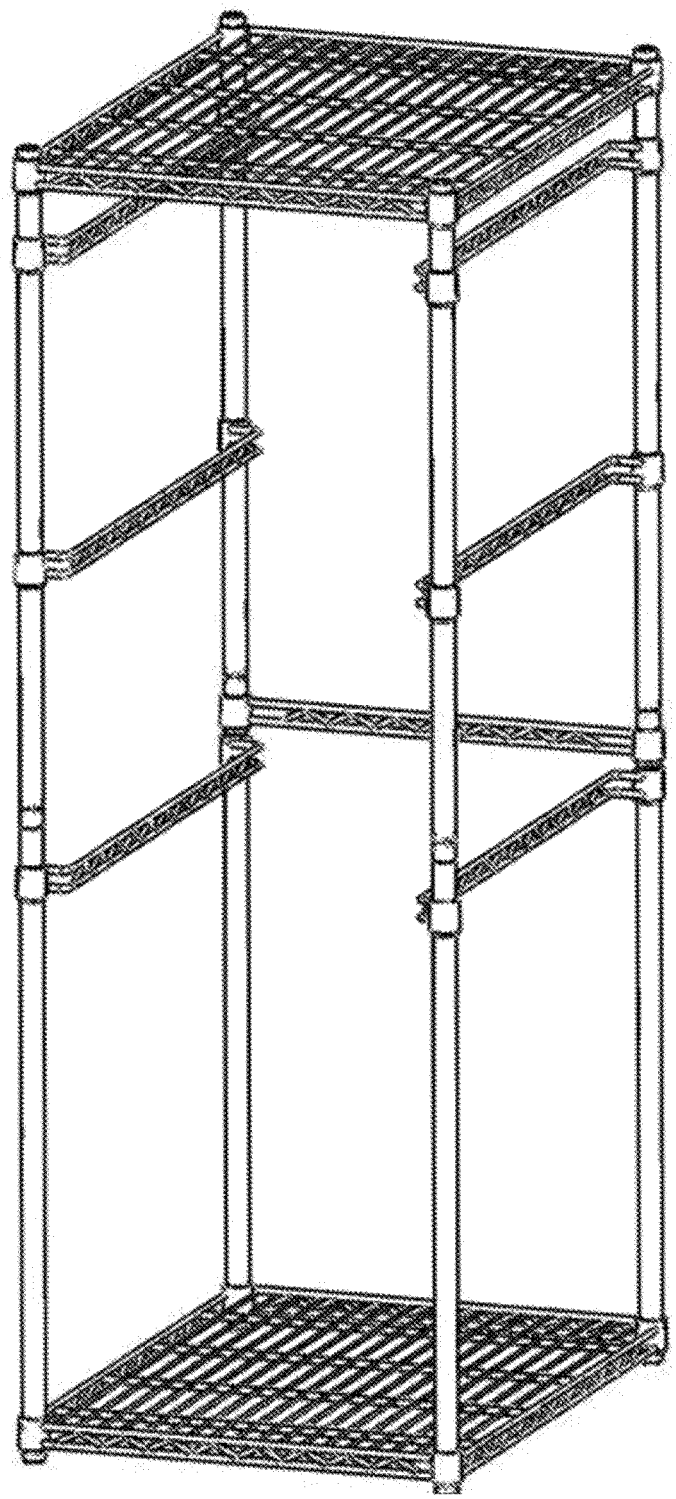
FIG. 4 depicts a perspective view exemplary vertical shelving unit.
Figure 5:
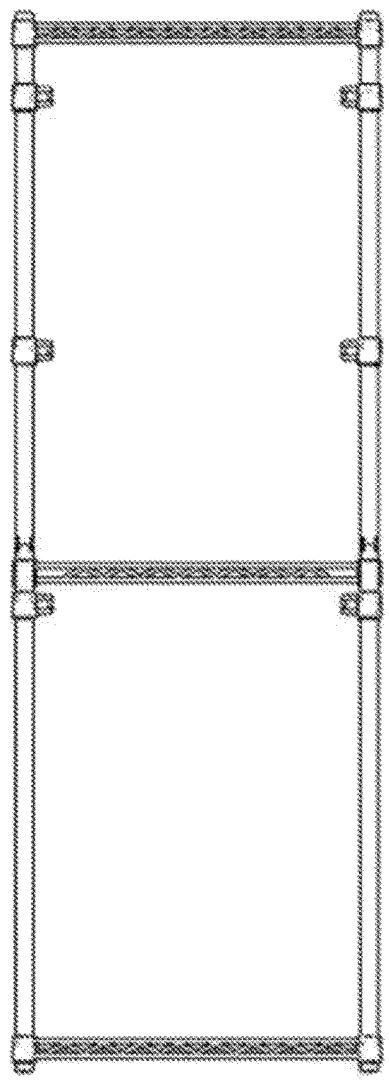
FIG. 5 depicts a back view exemplary vertical shelving unit.
Figure 6A:
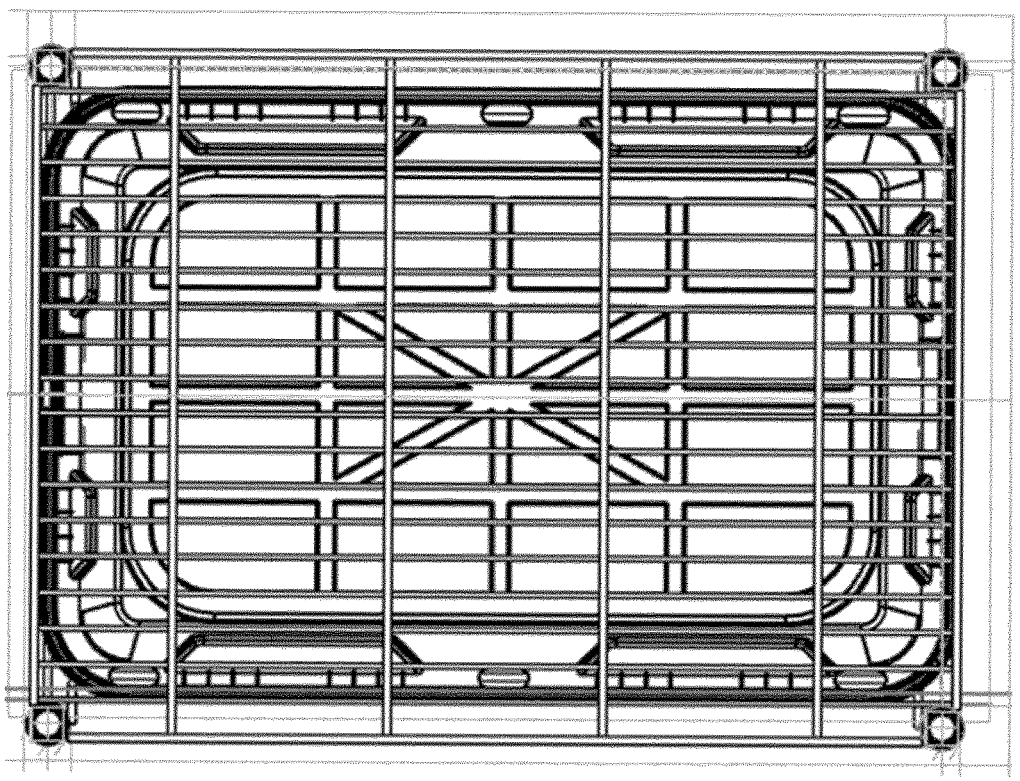
FIG. 6A depicts a bottom view exemplary vertical shelving unit.
Figure 6B:
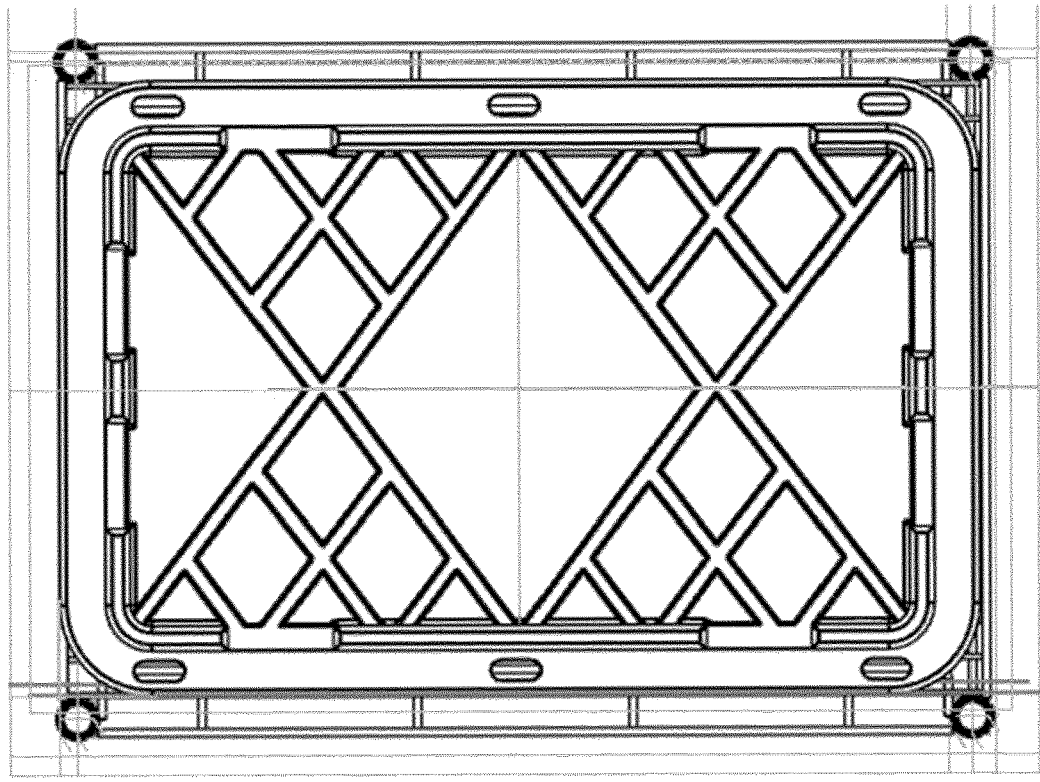
FIG. 6B depicts a top view exemplary vertical shelving unit.
Figure 7:
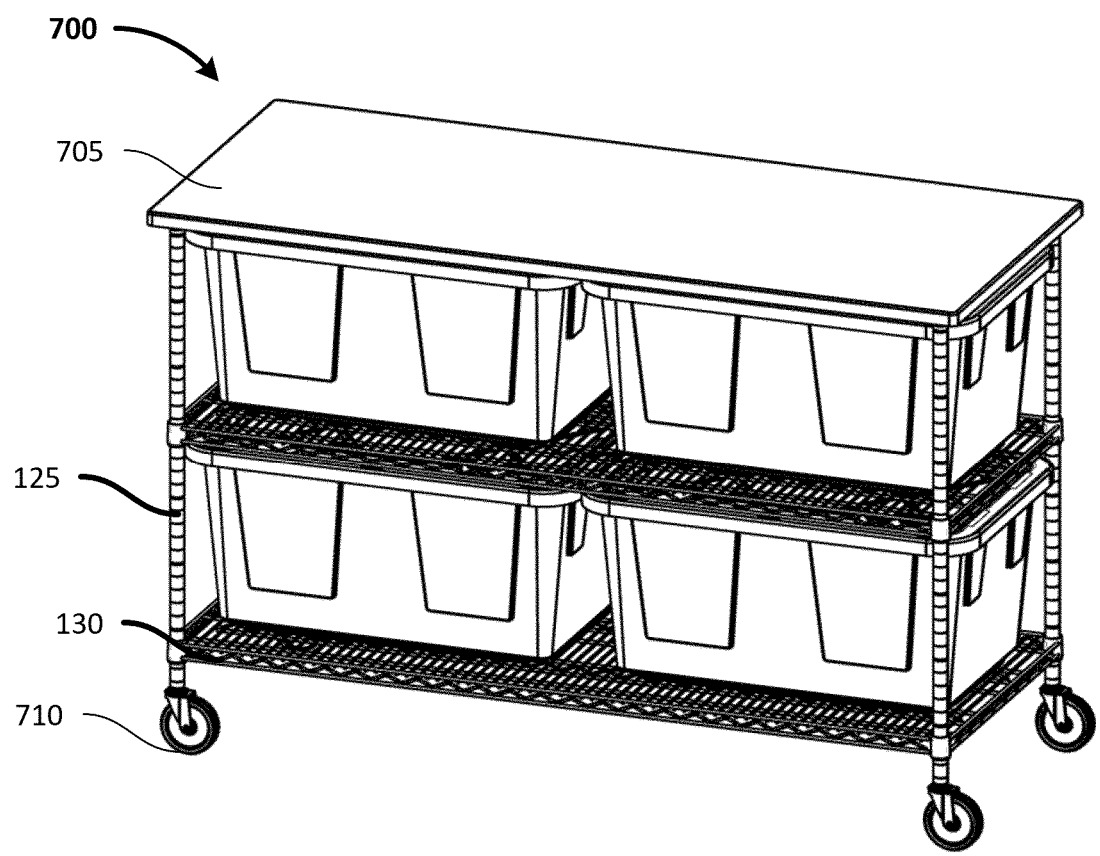
FIG. 7 depicts a top perspective view of an exemplary bin workbench.
Figure 8:
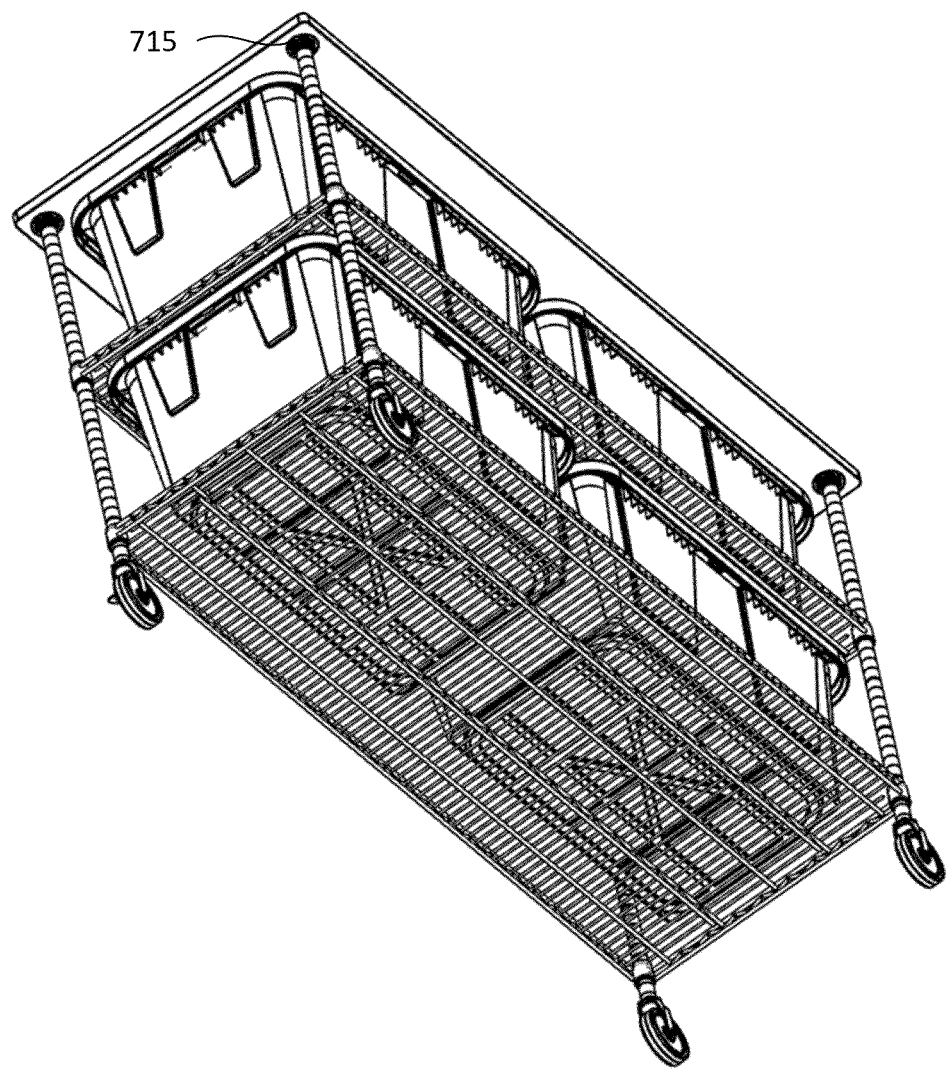
FIG. 8 depicts a bottom perspective view of an exemplary bin workbench.
Figure 9A:
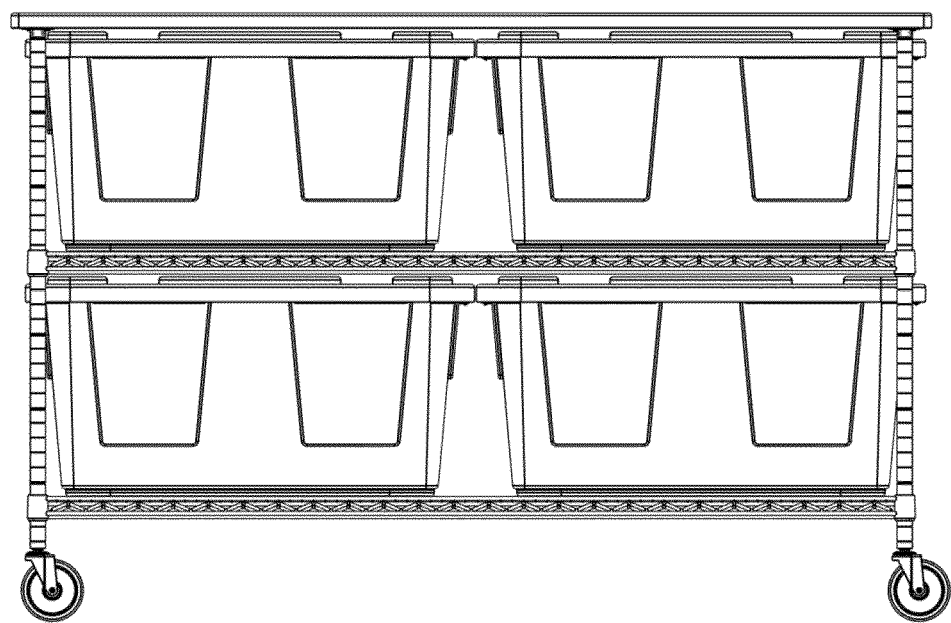
FIG. 9A depicts a front view of an exemplary bin workbench.
Figure 9B:
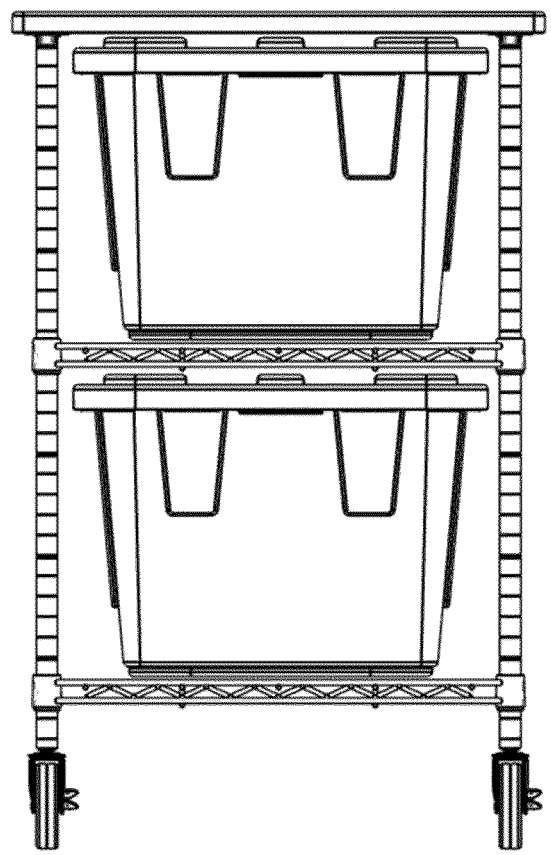
FIG. 9B depicts a side view of an exemplary bin workbench.
Figure 10A:
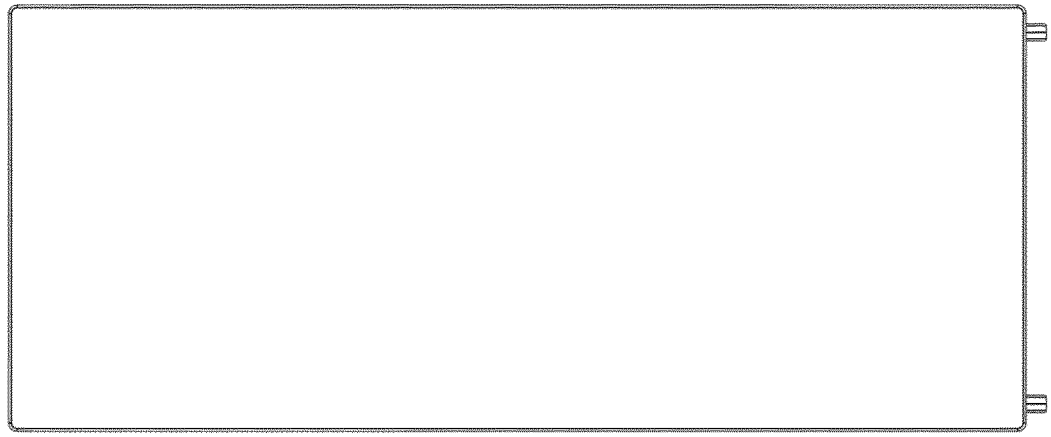
FIG. 10A depicts a top view of an exemplary bin workbench.
Figure 10B:
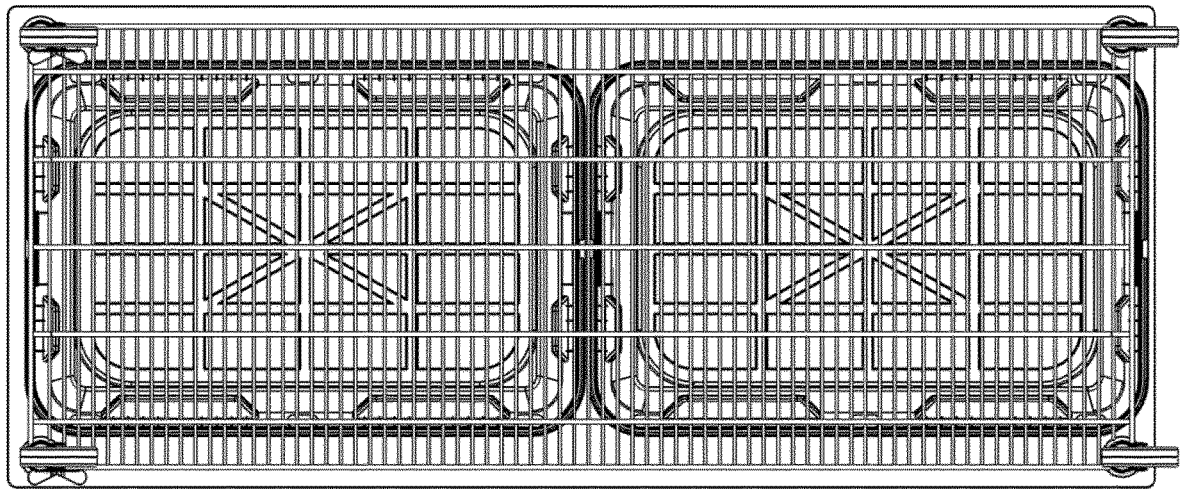
FIG. 10B depicts a bottom view of an exemplary bin workbench.
Figure 11A:
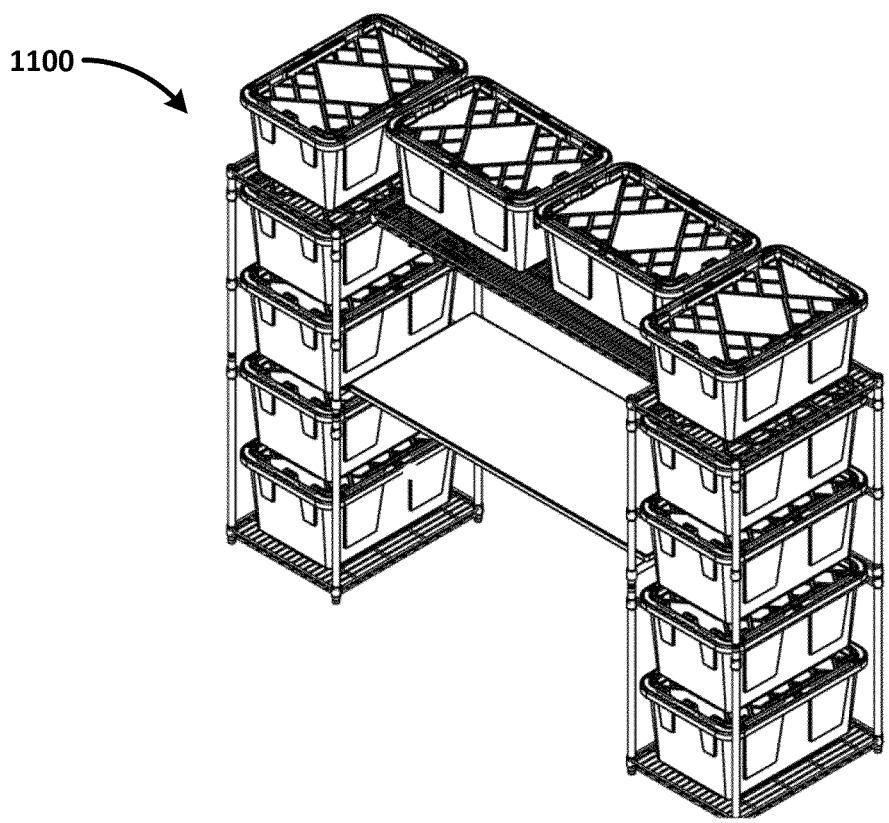
FIG. 11A depicts a top perspective view of an exemplary bin rack workspace with a worktop mount.
Figure 11B:
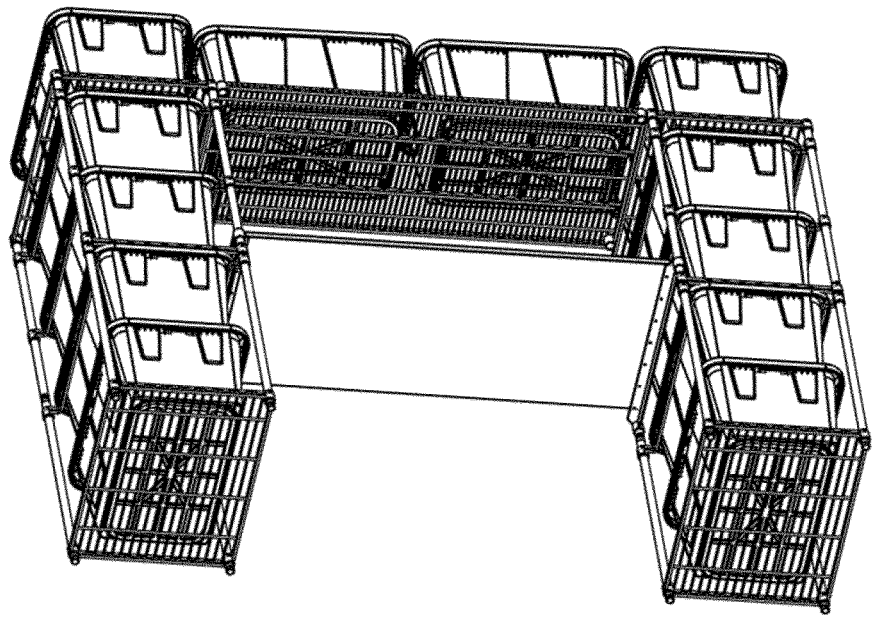
FIG. 11B depicts a bottom perspective view of an exemplary bin rack workspace with a worktop mount.
Figure 12A:
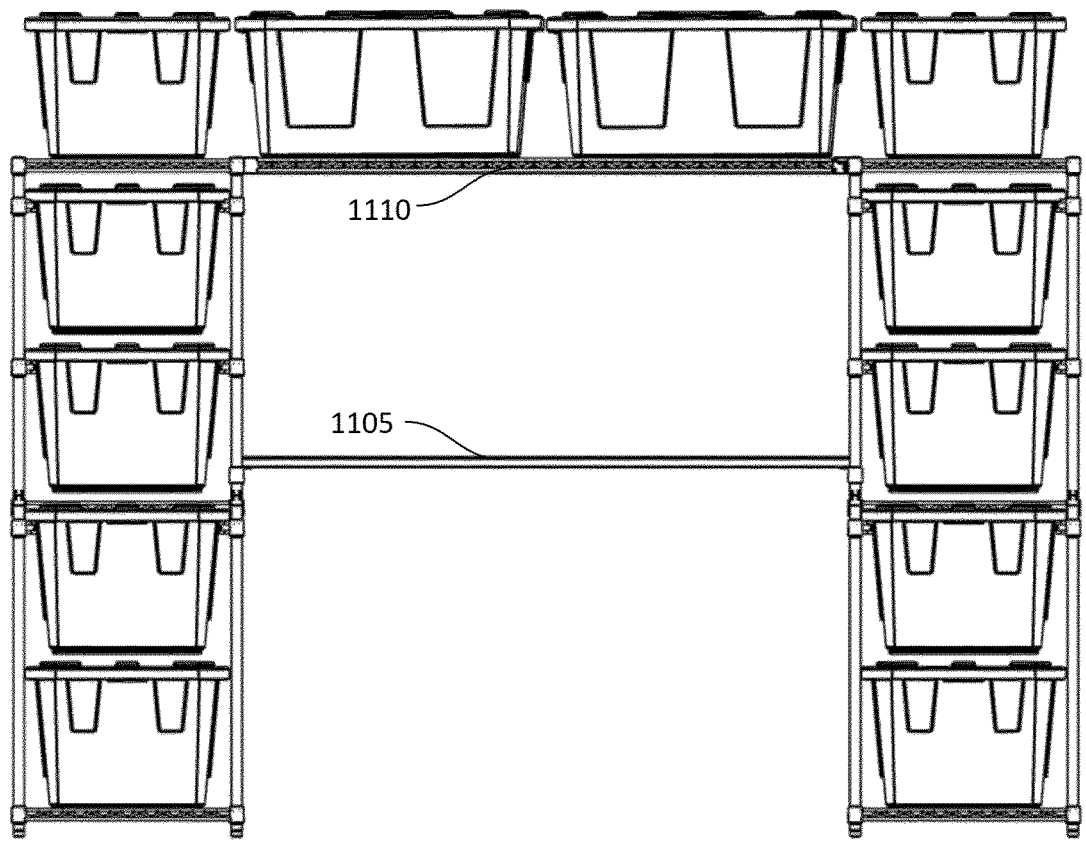
FIG. 12A depicts a front view of an exemplary bin rack workspace.
Figure 12B:
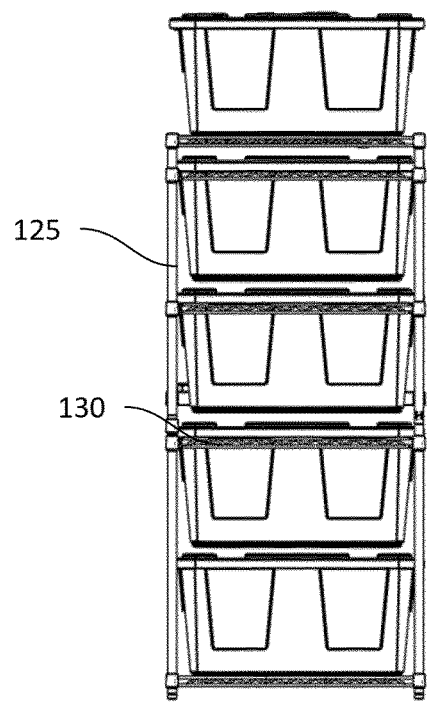
FIG. 12B depicts a side view of an exemplary bin rack workspace.
Figure 13A:
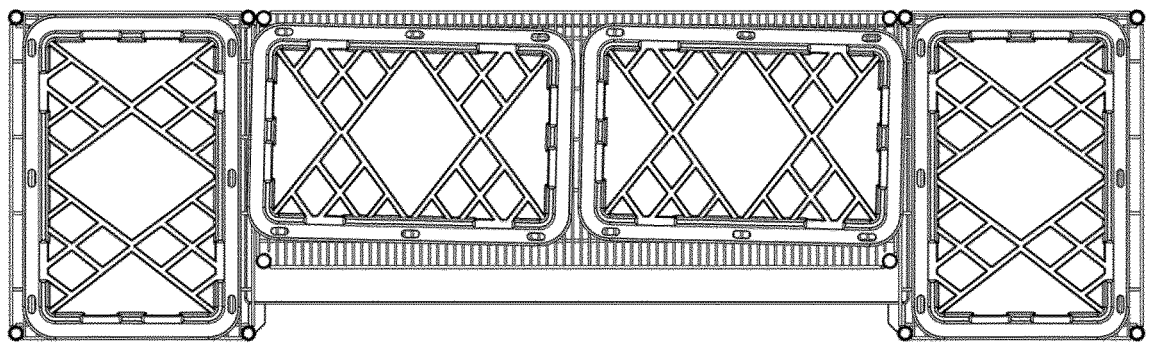
FIG. 13A depicts a top view of an exemplary bin rack workspace.
Figure 13B:
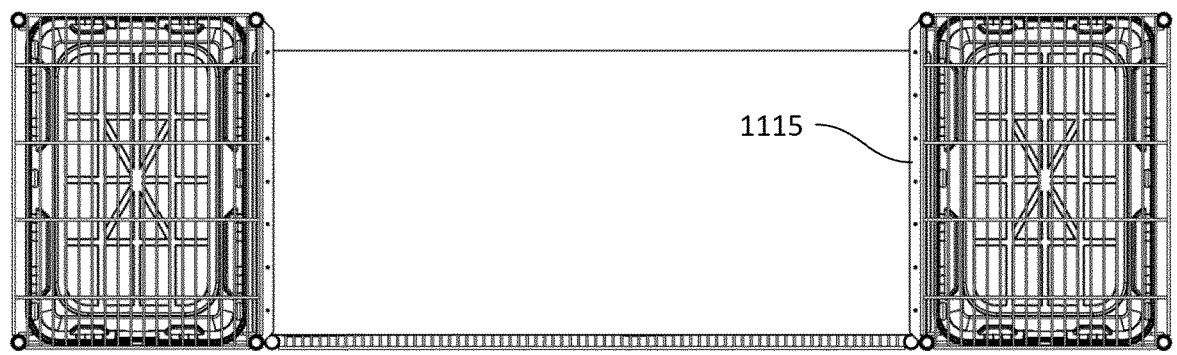
FIG. 13B depicts a bottom view of an exemplary bin rack workspace.
Figure 14:
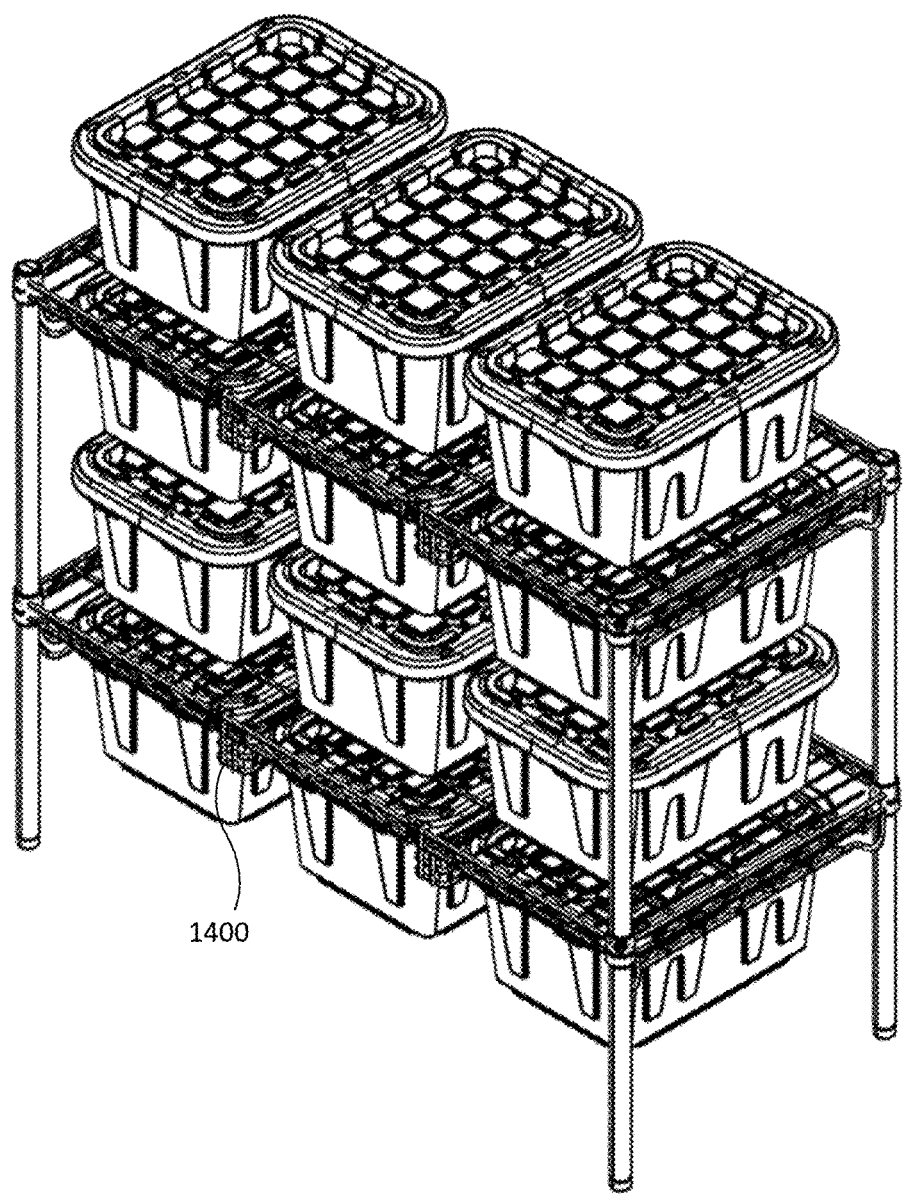
FIG. 14 depicts a top perspective view of a small bin rack with suspended rails.
Figure 15:
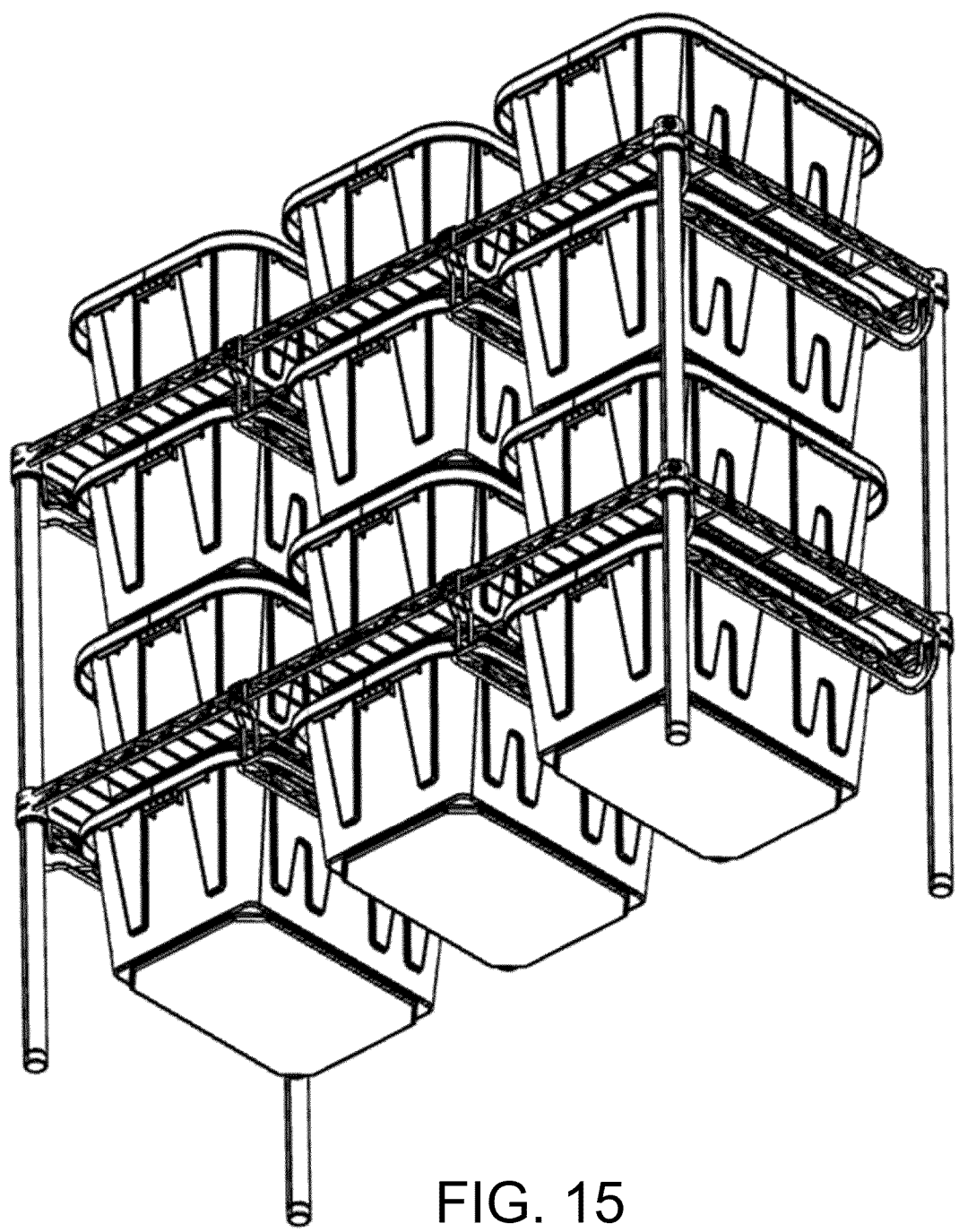
FIG. 15 depicts a bottom perspective view of a small bin rack with suspended rails.
Figure 16:
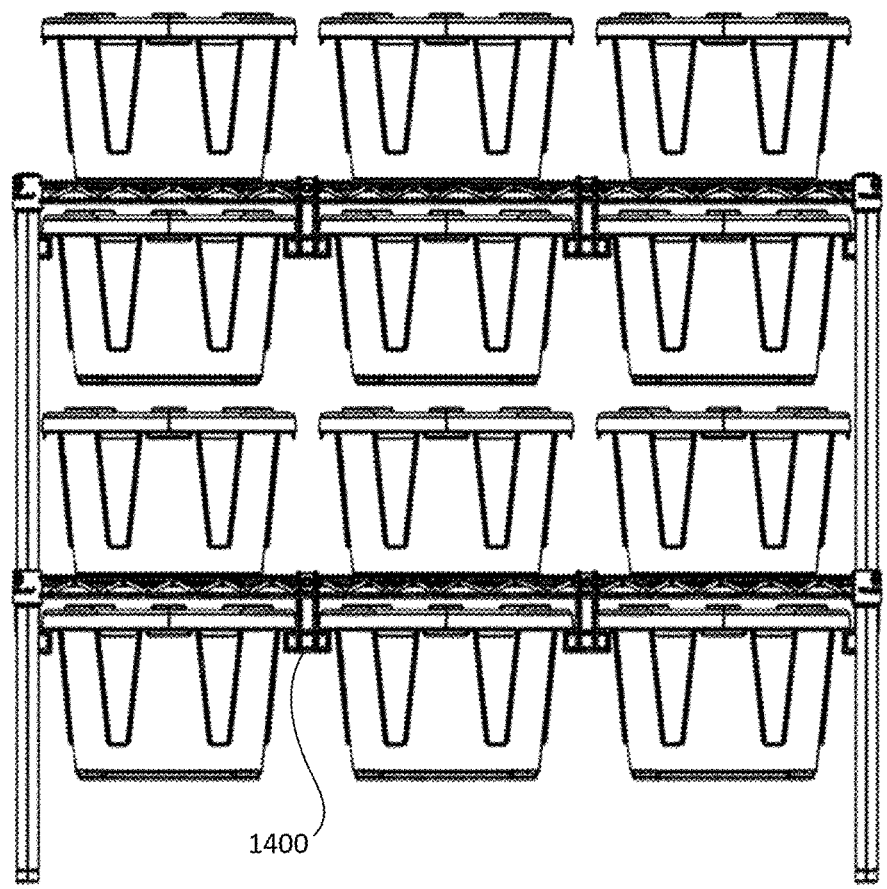
FIG. 16 depicts a front view of a small bin rack with suspended rails.
Figure 17:
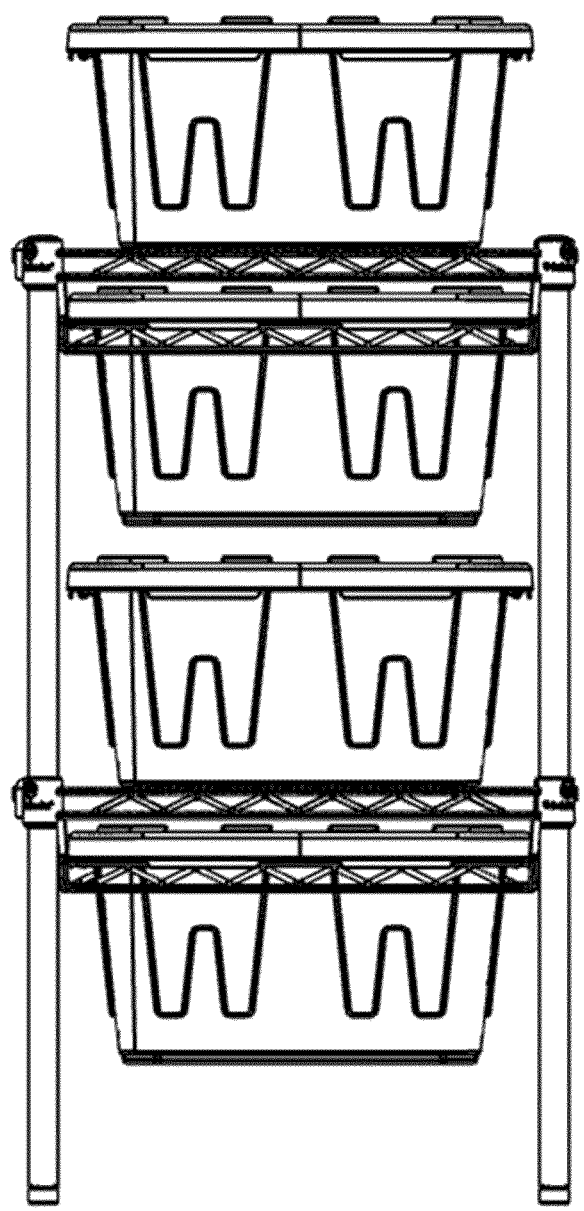
FIG. 17 depicts a side view of a small bin rack with suspended rails.
Figure 18A:
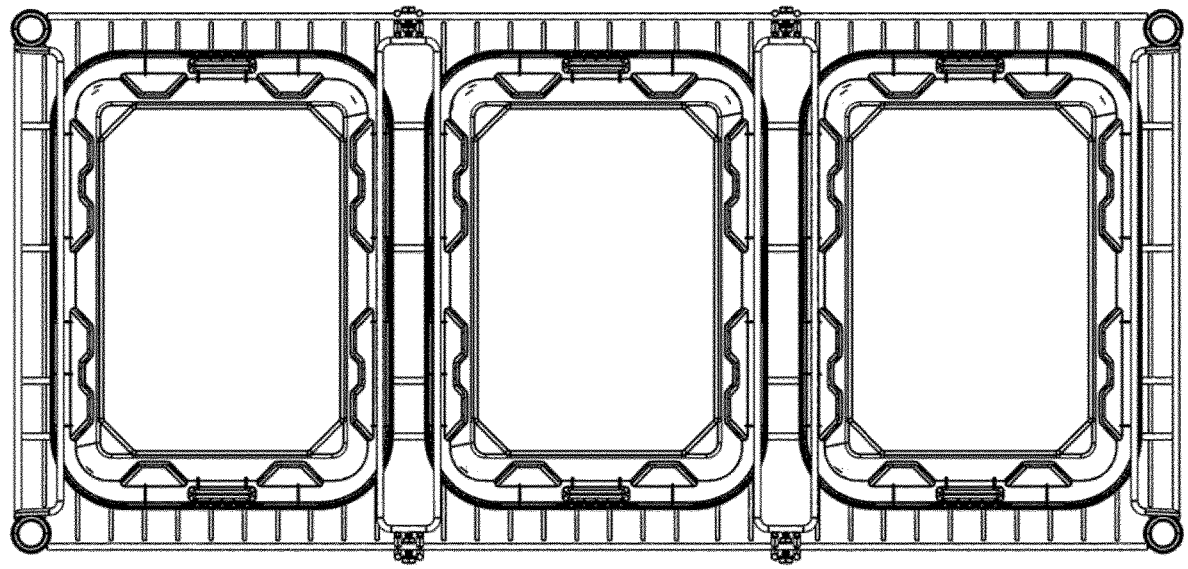
FIG. 18A depicts a bottom view of a small bin rack with suspended rails.
Figure 18B:
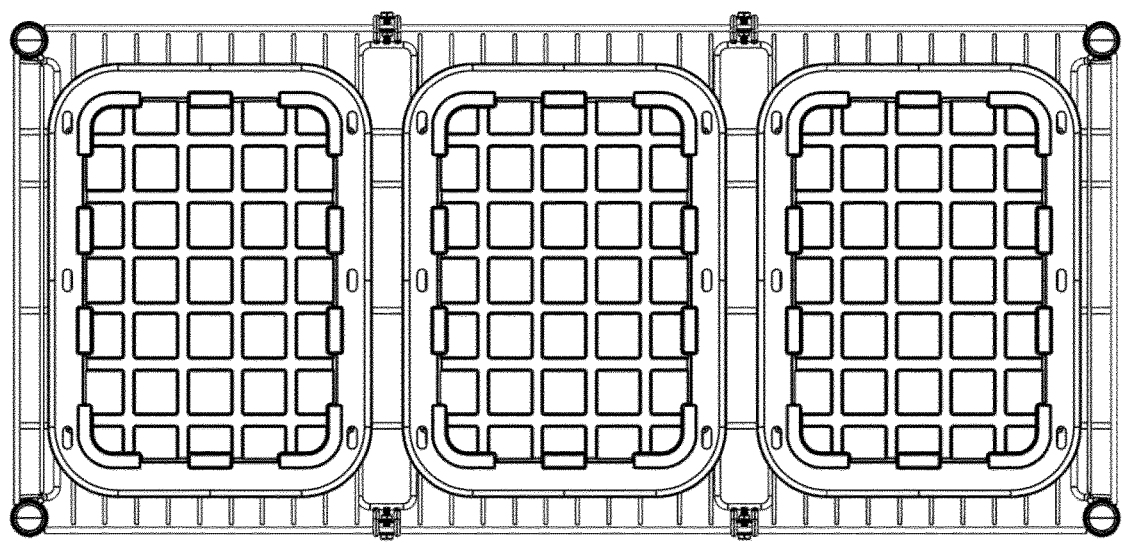
FIG. 18B depicts a top view of a small bin rack with suspended rails.

To aid understanding, this document is organized as follows: First, we introduce the discussion of various embodiments by presenting a vertical shelving unit system, as depicted in FIGS. 1A-1L. Second, we continue with a detailed description of some exemplary embodiments of vertical shelving units, referenced in FIGS. 2-4. Third, the application of these vertical shelving units to exemplary storage systems is described with reference to FIGS. 5-6B. Fourth, we turn our discussion to exemplary embodiments illustrating bin workbench applications, detailed in FIGS. 7-10B. Fifth, the document describes exemplary apparatus and methods useful for small bin racks with suspended rails, detailed in FIGS. 14-18B.

Figure 1A:
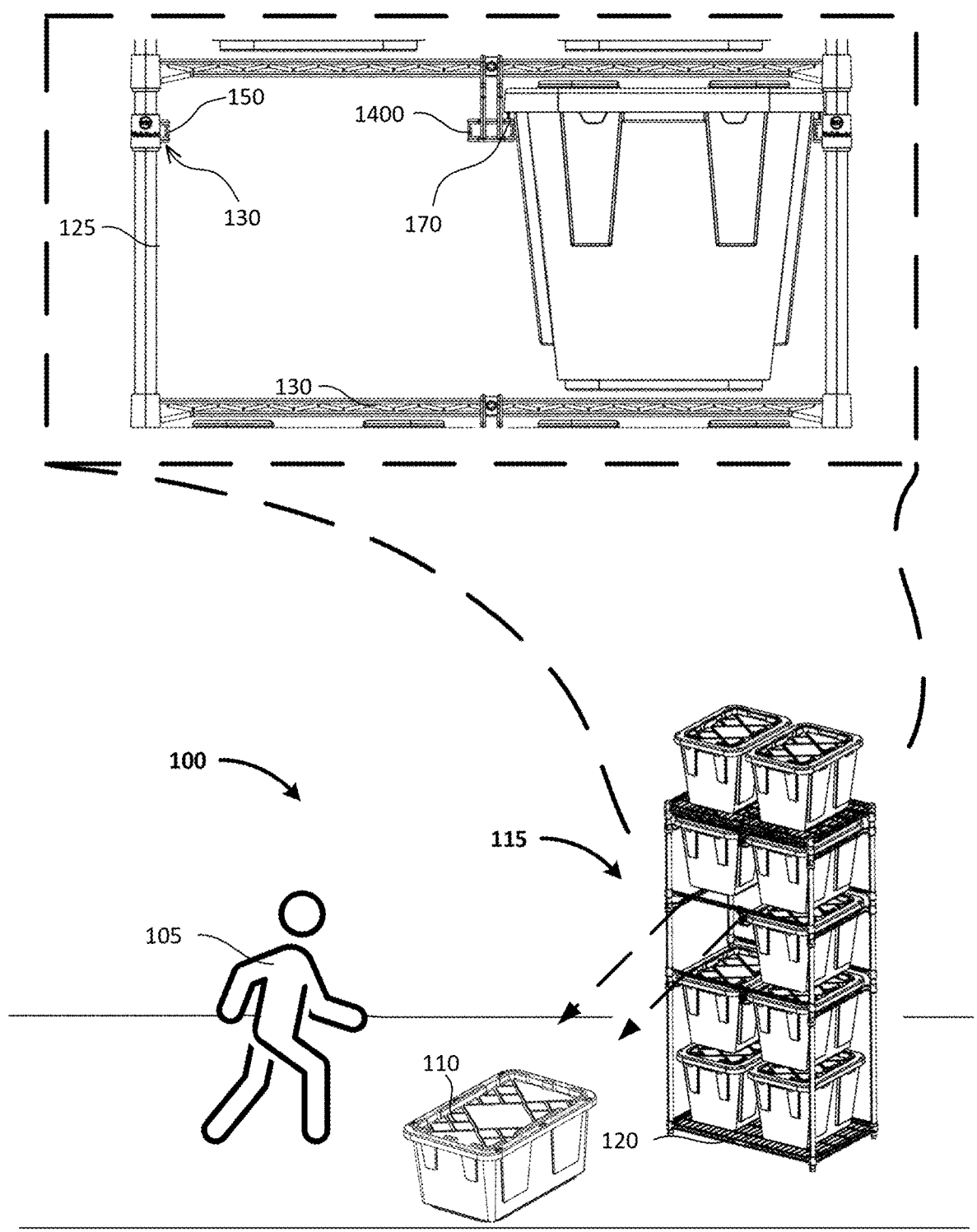
FIG. 1A depicts an exemplary double vertical shelving unit employed in an illustrative use-case scenario.

FIGS. 1A-1L depicts an illustrative use case scenario and some double vertical shelving unit embodiments. FIG. 1A depicts an illustrative use-case scenario 100. The illustrative use-case scenario 100 includes a user 105. The user 105 is pulling a bin 110. The bin 110 is being removed from a double vertical shelving unit 115. The double vertical shelving unit 115 includes a bottom shelf 120. The bottom shelf may, for example, be used alongside the top shelf to align the vertical posts. The double vertical shelving unit 115 includes a set of vertical posts 125 defining a three-dimensional space. The double shelving unit 115 includes a set of horizontal support members 130. The horizontal support members 130 are coupled to the vertical posts on opposing sides of the three-dimensional space. The horizontal support members 130 extend toward each other such that when a bin is removed and/or inserted into the double vertical shelving unit, a protruding lip 170 of the bin 110 supports the bin, such as depicted in FIG. 1A, the bin being supported by two lips, one in center on a suspended rail 1400, one on periphery. In examples such as shown more closely in FIG. 1C, the horizontal support members 130 (e.g., configured as a bent truss rail, as shown) include a truss structure 150 including an upper horizontal member 155 coupled to a lower horizontal member 160 by a set of truss members 165. The trusses may, for example, provide reaction forces such that the trusses avoid bending and/or shearing when force is applied to the horizontal beam from external forces.

Figure 1B:
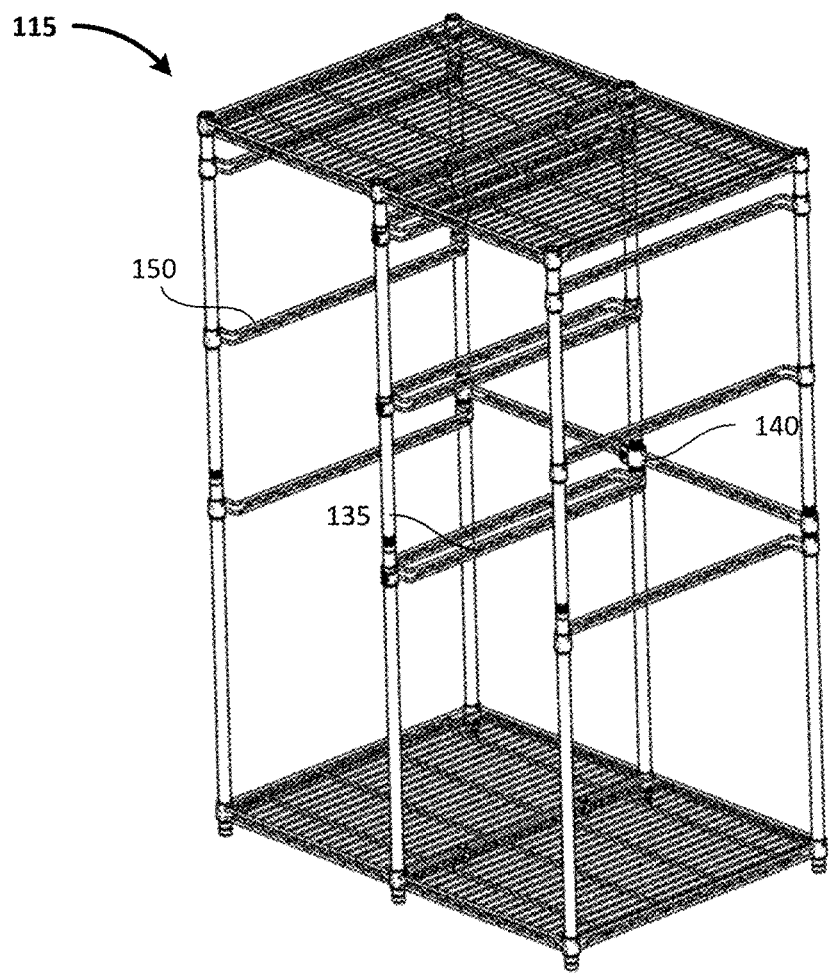
FIG. 1B depicts an exemplary double vertical shelving unit.
Figure 1C:
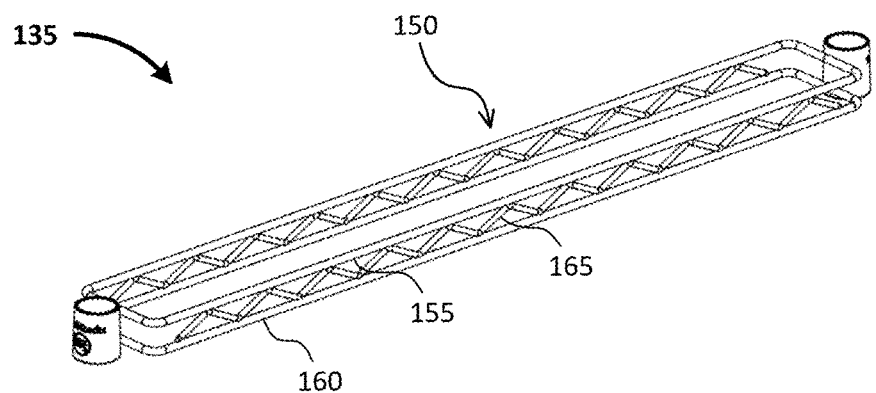
FIG. 1C depicts an exemplary bin rack doubler.

FIG. 1B depicts the double vertical shelving unit 115. The double vertical shelving unit includes a bin rack doubler 135 as depicted in FIG. 1C. The bin rack doubler may, for example, allow a user to combine and/or expand their existing bin racks in a space-saving assembly. The bin rack doubler may, for example, be included in an extension kit. The bin rack doubler may, for example, include a tie support that attaches to the adjacent unit using a bolted clamp mechanism. The exemplary double vertical shelving includes a rear horizontal member 140 that may, for example, be used prevent the bin from dislocating itself from the assembly from the rear.

In some embodiments, the vertical shelving unit may, for example, include a horizontal back strap configured to limit the backward travel of bins. This feature may, for example, add stability to the stored items, preventing bins from accidentally being pushed too far back, which could lead to spills or disorganization. The horizontal back strap may, for example, be a component that enhances the safety and functionality of the shelving unit, such as environments where frequent access and high loading activities occur.

In some embodiments, the inclusion of a horizontal back strap may, for example, ensure that bins remain securely in place even under conditions of rapid movement or when the shelving unit is subjected to environmental vibrations, such as those found in industrial settings or during transport within a facility. This stability may, for example, be used to maintain order and safety, reducing the risk of damage to the contents of the bins or the shelving structure itself. The horizontal back strap may, for example, be constructed from materials that complement the overall durability and strength of the shelving unit, ensuring a cohesive and reliable storage solution.

In some embodiments, the horizontal back strap may, for example, contribute to the ergonomic configuration of the shelving unit by providing a predictable limit to bin movement, which may enhance user experience by making the retrieval and storage of items more efficient. This feature may, for example, be particularly beneficial in high-throughput areas where time and ease of access are important, improving operational efficiency and user satisfaction. By preventing bins from shifting too far back, the horizontal back strap may, for example, also facilitate easier and safer access to lower and deeper parts of the shelving unit.

Figure 1D:
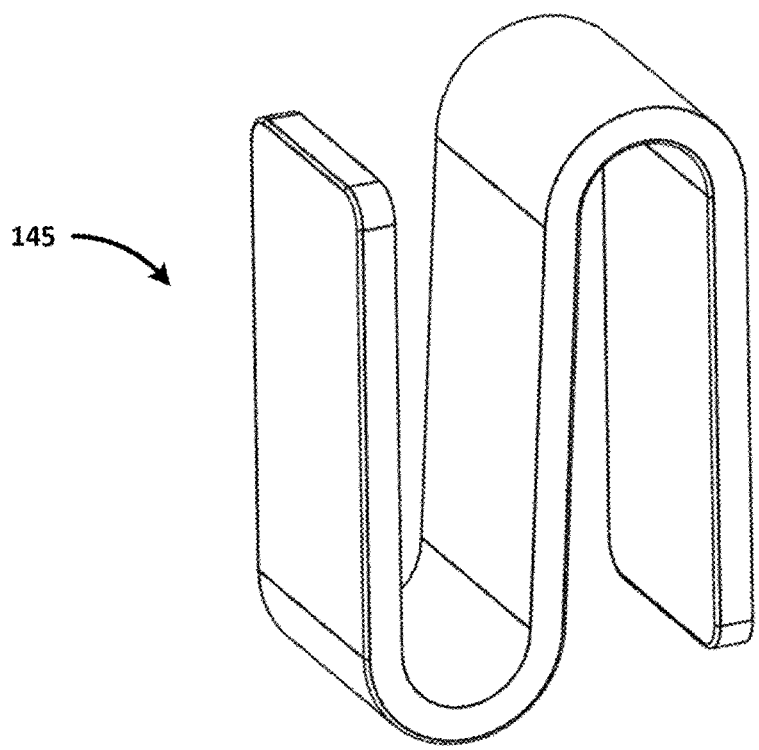
FIG. 1D depicts an exemplary interlocking component S-hook.

FIG. 1D depicts an exemplary interlocking component S-hook 145. The S-hook may, for example, be used to couple two shelving units together to form a double vertical shelving unit. The S-hooks may, for example, be included in an interlocking assembly kit. The interlocking assembly kit may, for example, include 1" bin rack posts. The interlocking assembly kit may, for example, include extender sleeves. The interlocking assembly kit may, for example, include S-hooks. The interlocking assembly kit may, for example, include a double center support. The interlocking assembly kit may, for example, include extra sleeves. The interlocking assembly kit may, for example, include feet. The interlocking assembly kit may, for example, include caps. The vertical shelving unit may, for example, include a wire shelf.

Figure 1E:
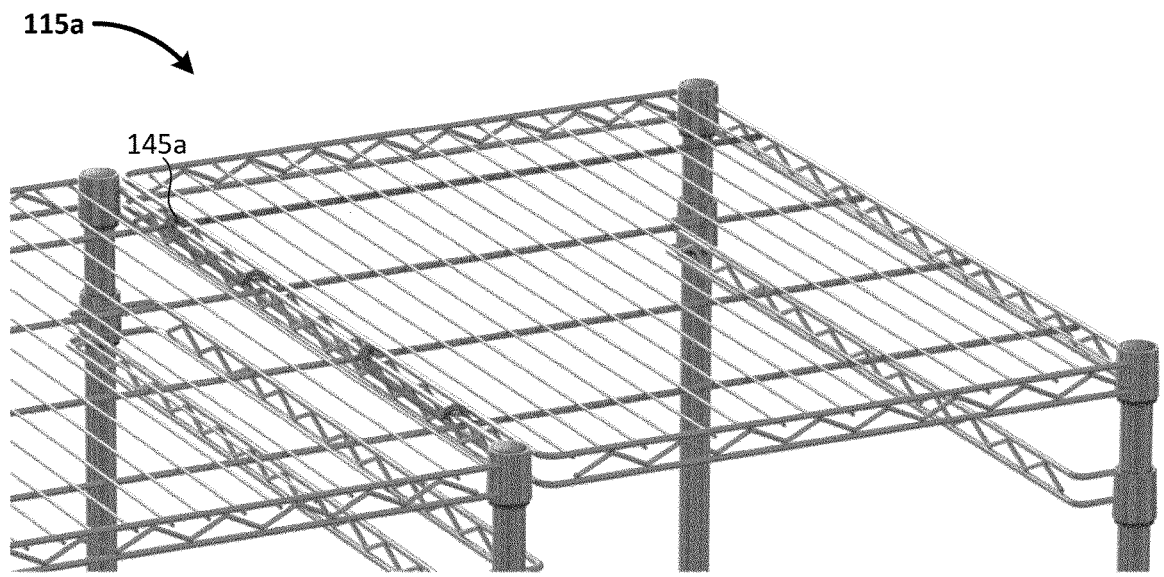
FIG. 1E depicts an exemplary interlocking component extension shelf.
Figure 1F:
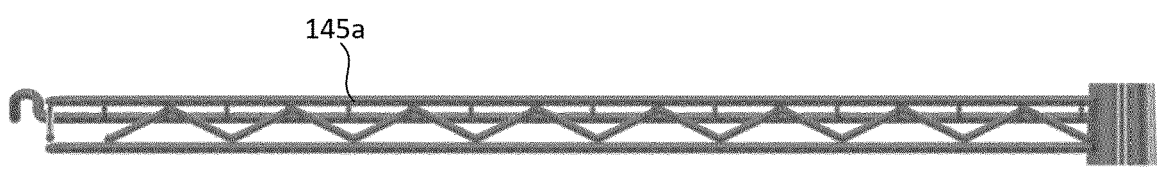
FIG. 1F depicts an exemplary interlocking component extension shelf horizontal member.

FIG. 1E depicts another embodiment of the exemplary vertical shelving doubler 115*a*. The exemplary vertical shelving doubler includes an extension shelf 145*a* that incorporates shelf hooks into the structural members. FIG. 1F depicts a side view of the extension shelf 145A.

Figure 1G:
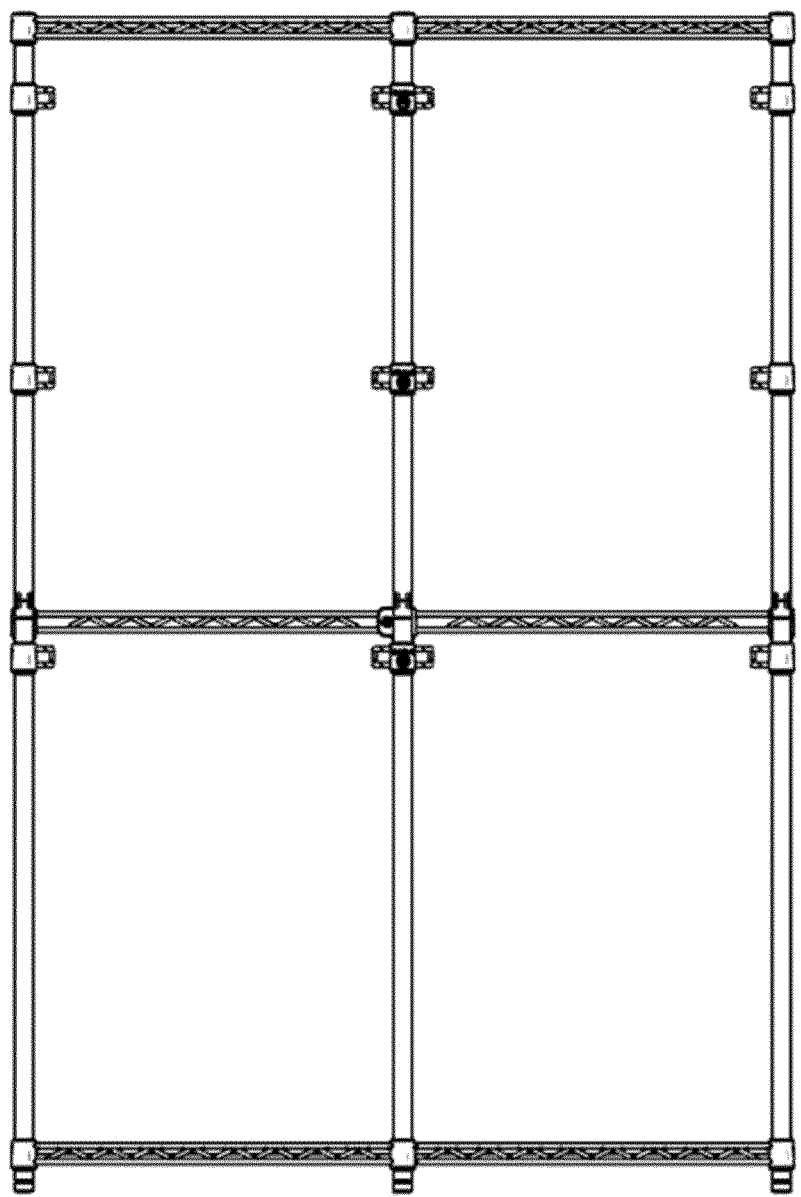
FIG. 1G depicts an exemplary front view of an exemplary vertical shelving unit.
Figure 1H:
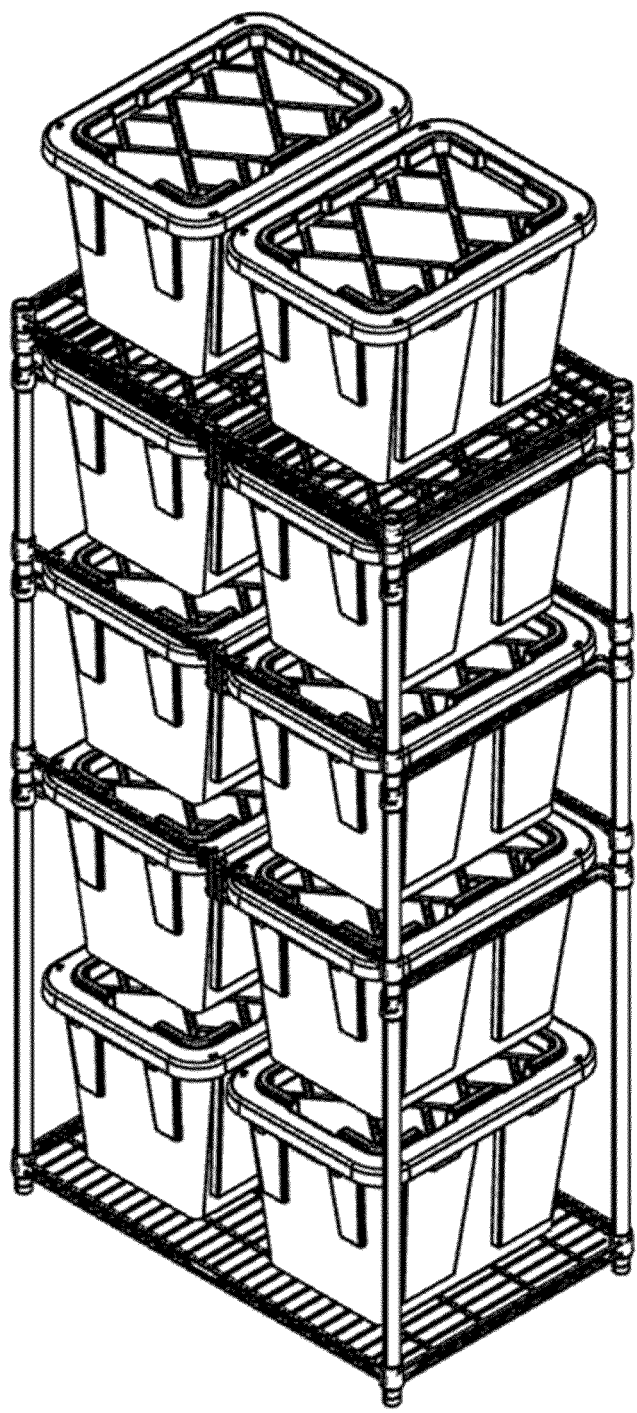
FIG. 1H depicts an exemplary perspective view of the vertical shelving unit.
Figure 1J:
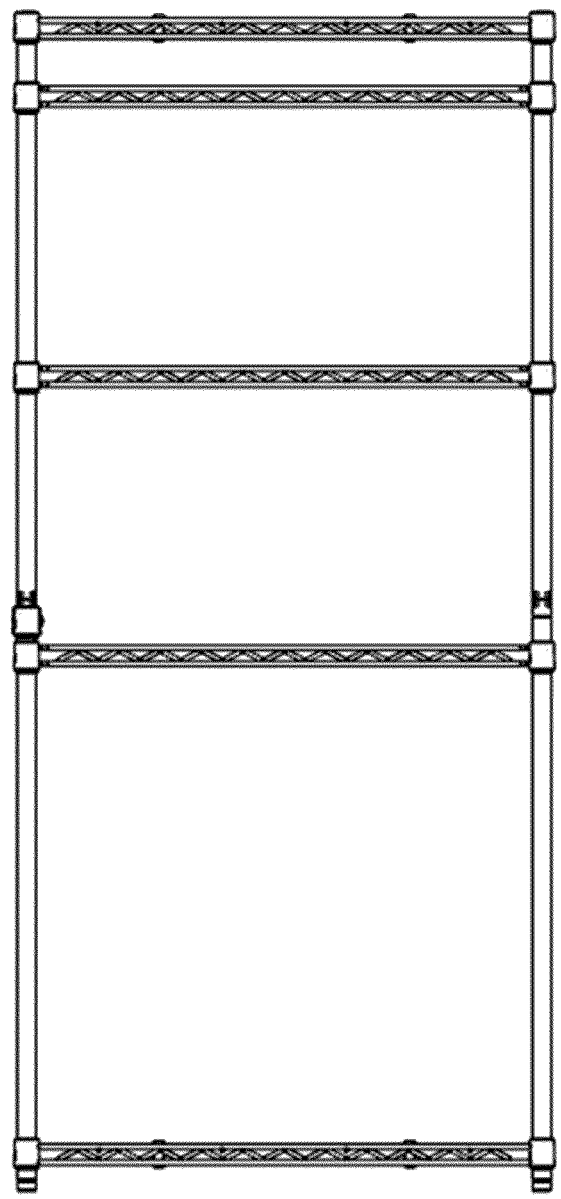
FIG. 1J depicts an exemplary side view of the exemplary vertical shelving unit.
Figure 1K:
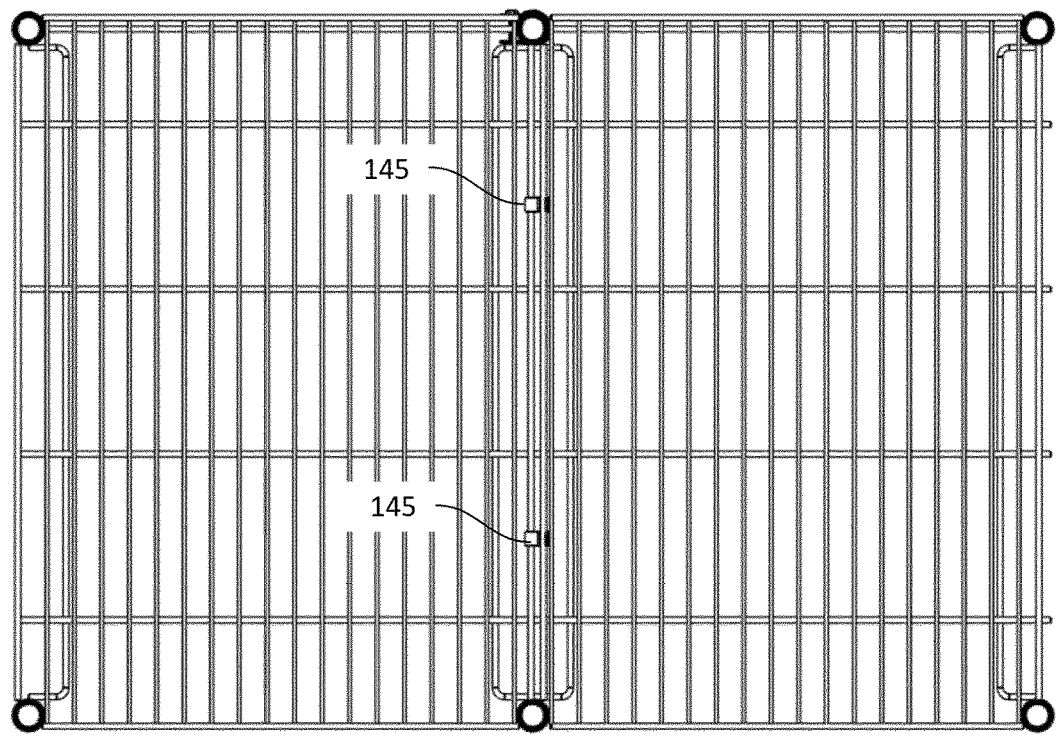
FIG. 1K depicts an exemplary bottom view of the exemplary shelving unit.
Figure 1L:
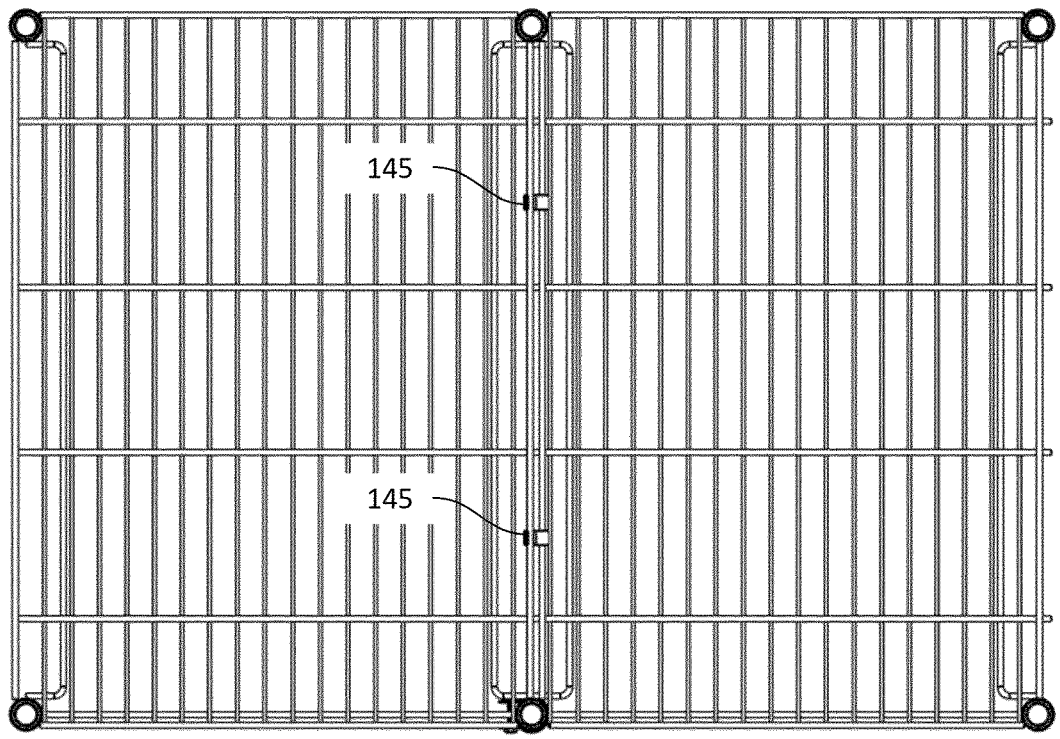
FIG. 1L depicts an exemplary top view of the exemplary shelving unit.

FIG. 1G-1L depicts exemplary views of the double vertical shelving unit. FIG. 1G depicts a front view of the vertical shelving doubler. FIG. 1H depicts a perspective view of the vertical shelving doubler. FIG. 1J depicts a side view of the vertical shelving doubler. FIG. 1K-1L depicts a top and bottom view including the S-hook interlocking components 145 which couple the two shelves together.

In some implementations, some embodiments of the vertical shelving doubler may be adjustable in terms of width to accommodate bins of various sizes, ensuring efficient space utilization. The vertical shelving doubler may, for example, include detachable and reconfigurable components that allow for customization of the shelving layout, suitable for businesses experiencing seasonal changes in inventory types and sizes. Enhanced mobility features may also be integrated, such as casters and/or wheels at the base of the vertical posts, allowing the entire shelving unit to be moved easily across different parts of a facility.

In some implementations, integrated lighting systems may be incorporated to improve visibility and accessibility, particularly beneficial in environments where lighting conditions are sub-optimal, such as warehouses and large storage facilities. Security features in some embodiments may include locking mechanisms that secure the bins in place, providing an additional layer of security against unauthorized access.

In some embodiments, the vertical shelving doubler may, for example, support electronic inventory management systems, featuring built-in scanners and/or RFID readers that facilitate real-time tracking of items, enhancing logistical efficiency and reducing manual labor. Materials used in the construction of the vertical shelving doubler may include corrosion-resistant substances such as stainless steel and/or coated metals. This may, for example, be important in harsh environments where moisture, temperature fluctuations, and chemical exposures are common.

In some embodiments, the configuration may, for example, facilitate easy disassembly and reassembly, promoting recycling and/or repurposing of components in line with sustainability commitments, allowing businesses to adapt or upgrade their storage systems without generating significant waste.

In some implementations, wall-mounted embodiments of the vertical shelving doubler may be configured for secure attachment to building walls, maximizing floor space and enhancing the organizational layout in environments with limited ground area. These embodiments may incorporate rails and/or brackets that facilitate both installation and stability, making them suitable for holding bins and other storage containers securely against the wall.

In some implementations, adjustable embodiments may feature components such as telescopic vertical posts and/or movable shelves that allow for customization of shelf height and spacing. This adjustability may be particularly useful in environments where the stored items vary in size, enabling optimal space usage and easy reconfiguration according to changing needs. In some implementations, fixed embodiments of the vertical shelving doubler may provide robust, non-modifiable storage solutions that ensure stability and durability.

Some embodiments may, for example, be configured to environments requiring permanent installation with minimal maintenance. Materials used may include heavy-duty metals that may support substantial weight without risk of deformation or failure. In some implementations, freestanding embodiments may include versatile placement within various environments without the need for wall support.

Some embodiments may include a base with a wider footprint to ensure stability or be configured to interlock with similar units to create larger, cohesive storage systems without permanent attachment to building structures.

In some implementations, the double vertical shelving unit may, for example, feature a rail/shelf combination. The double vertical shelving unit may, for example, have rails that are attached directly to the shelf above. This configuration may, for example, streamline the assembly process by simplifying the overall structure.

In some implementations, the double vertical shelving unit may, for example, use a method where the rails attach directly to the underside of the shelf above. This approach may, for example, reduce the number of separate components such as rail supports or additional brackets. The double vertical shelving unit may, for example, decrease the overall component count, making the assembly more straightforward.

In some implementations, the double vertical shelving unit may, for example, benefit from increased rigidity due to the direct attachment of the rails to the shelf. This configuration may, for example, ensure a more stable and durable setup. The double vertical shelving unit may, for example, enhance the structural integrity, making the shelving unit more robust and suitable for supporting heavier loads.

In some implementations, the double bin rack with suspended center rails may, for example, eliminate the need for center posts. This configuration may, for example, use tie-supports to suspend a shared middle rail, optimizing space and structural efficiency.

In some implementations, the double bin rack with suspended center rails may, for example, facilitate the hanging of bins directly beneath standard wire shelves. This arrangement may, for example, maximize the vertical storage capacity, allowing for efficient use of space in storage environments.

In some implementations, the double bin rack with suspended center rails may, for example, enhance stability and accessibility. The configuration may, for example, allow for easy access to bins without disrupting the arrangement of other bins, suitable for high-demand storage applications.

FIGS. 2-6B depict some perspective views of an exemplary vertical shelving unit. In some implementations, the vertical shelving unit may, for example, enable bins to be stored vertically without the need to down-stack. The vertical shelving unit may, for example, allow for stacking bins directly above each other. In some implementations, the vertical shelving unit may, for example, support bins from their side rails, ensuring stability and accessibility for each bin. The vertical shelving unit may, for example, offer ease of access to bin lids, facilitating quick and easy opening and closing of bin lids.

In some implementations, the vertical shelving unit may, for example, be crafted with a durable configuration to withstand frequent use and heavy loads. The vertical shelving unit may, for example, incorporate a minimalist construction that achieves a reduction in overall weight. The vertical shelving unit may, for example, maintain structural integrity while being lightweight, promoting easier handling and reconfiguration.

In some implementations, the vertical shelving unit may, for example, feature a rail/shelf combination. The vertical shelving unit may, for example, have rails that are attached directly to the shelf above. This configuration may, for example, streamline the assembly process by simplifying the overall structure.

In some implementations, the vertical shelving unit may, for example, use a method where the rails attach directly to the underside of the shelf above. This approach may, for example, reduce the number of separate components such as rail supports or additional brackets. The vertical shelving unit may, for example, decrease the overall component count, making the assembly more straightforward.

In some implementations, the vertical shelving unit may, for example, benefit from increased rigidity due to the direct attachment of the rails to the shelf. This configuration may, for example, ensure a more stable and durable setup. The vertical shelving unit may, for example, enhance the structural integrity, making the shelving unit more robust and suitable for heavy-duty use.

FIGS. 7-10B depict some perspective views of an exemplary bin workbench 700. The exemplary bin workbench includes a work surface 705. The bin workbench may, for example, feature a hardwood work surface. The hardwood work surface may, for example, provide a durable and visually appealing area for various tasks. The exemplary bin workbench 700 includes the vertical posts 125. These vertical posts may, for example, be made from durable materials like metal or reinforced plastic to ensure stability and longevity. The exemplary bin workbench 700 includes the horizontal members 130. These horizontal members may, for example, be adjustable, allowing for customization according to the size of the bins stored. The exemplary bin workbench 700 includes casters 710. These casters may, for example, allow the entire unit to be moved easily across different floor types without compromising the stability of the stored items. The exemplary bin workbench 700 includes a mount 715. The bin workbench mount may, for example, screw into standard 1" wire rack supporting tubing. The bin workbench mount may, for example, include multiple slots in the top flange to allow for infinite adjustability. The bin workbench mount may, for example, be unscrewed to allow for precision leveling of the worktop.

In some implementations, the bin cart may, for example, store up to four bins. The bin cart may, for example, change the number of bins it may store in different embodiments. In some implementations, the bin cart may, for example, feature a hardwood work surface. The bin cart may, for example, provide a durable and aesthetically pleasing area for various tasks.

In some implementations, the bin cart may, for example, include assembly with threaded and/or friction-fit components. The bin cart may, for example, facilitate quick setup and disassembly as needed. In some implementations, the bin cart may, for example, include large casters to allow for workspace flexibility. The bin cart may, for example, be easily moved across different environments to suit dynamic workspace needs.

In some implementations, the bin workbench mount may, for example, screw into standard 1" wire rack supporting tubing. The bin workbench mount may, for example, provide a secure and stable connection for the work surface. In some implementations, the bin workbench mount may, for example, include multiple slots in the top flange to allow for infinite adjustability. The bin workbench mount may, for example, enable precise positioning of the work surface to meet specific operational requirements. The bin workbench mount may, for example, be unscrewed to allow for precision leveling of the worktop, ensuring a level horizontal working area under various conditions.

In some implementations, the exemplary bin workbench may, for example, feature a rail/shelf combination. The exemplary bin workbench may, for example, have rails that are attached directly to the shelf above. This configuration may, for example, streamline the assembly process by simplifying the overall structure.

In some implementations, the exemplary bin workbench may, for example, use a method where the rails attach directly to the underside of the shelf above. This approach may, for example, reduce the number of separate components such as rail supports or additional brackets. The exemplary bin workbench may, for example, decrease the overall component count, making the assembly more straightforward.

In some implementations, the exemplary bin workbench may, for example, benefit from increased rigidity due to the direct attachment of the rails to the shelf. This configuration may, for example, ensure a more stable and durable setup. The exemplary bin workbench may, for example, enhance the structural integrity, making the workbench more robust and suitable for heavy-duty use.

FIGS. 11A-13B depict some views of an exemplary bin rack workspace 1100 with a worktop mount. The bin rack workspace 1100 may, for example, utilize a hardwood work surface to provide durability and aesthetic appeal. The exemplary bin rack workspace 1100 includes a worktop 1105. The worktop 1105 may, for example, have an adjustable height to accommodate various tasks and user preferences. The exemplary work bin rack workspace 1100 includes a top shelving 1110. The top shelving 1110 may, for example, be part of an extension kit that allows for storage of up to 12 bins. The exemplary work bin rack workspace 1100 includes vertical posts 125. The vertical posts 125 may, for example, utilize interlocking components like S-hooks to create a 24×60 wire shelf for the top extension. The exemplary bin rack workspace includes horizontal members 130. These horizontal members 130 may, for example, support the secure mounting of the wooden workspace between two bin racks. The exemplary bin rack workspace 1100 includes a worktop mount 1115. By attaching the workspace mount to the wood slab, its height may, for example, be easily adjusted to facilitate ergonomic and practical workspace configurations.

In some implementations, the bin rack workspace may, for example, include modular features such as pull-out drawers. The bin rack workspace may, for example, provide extra storage beneath the worktop. The bin rack workspace may, for example, be used to access tools and materials. The bin rack workspace may, for example, maintain stability.

In some implementations, the bin rack workspace may, for example, accommodate specialized equipment. The bin rack workspace may, for example, integrate power supplies or tool docks directly into the workspace. The bin rack workspace may, for example, streamline operations in environments where electrical tools are used frequently. The bin rack workspace may, for example, enhance productivity and safety.

In some implementations, the bin rack workspace may, for example, feature a collapsible configuration. The bin rack workspace may, for example, allow quick disassembly and/or reassembly. The bin rack workspace may, for example, be useful for temporary workstations. The bin rack workspace may, for example, benefit environments where space flexibility is important. The bin rack workspace may, for example, enable easy transport and storage when not in use.

In some implementations, the bin rack workspace may, for example, feature wall mount embodiments. The bin rack workspace may, for example, allow vertical shelving units to be attached directly to wall surfaces. The bin rack workspace may, for example, maximize floor space by elevating storage off the ground.

In some implementations, the bin rack workspace may, for example, include wall mounts that are configured for easy installation. The bin rack workspace may, for example, use standard mounting hardware that fits securely into existing wall studs. The bin rack workspace may, for example, provide stable support for heavy loads.

In some implementations, the bin rack workspace may, for example, include adjustable wall mounts. The bin rack workspace may, for example, allow users to adjust the height and/or angle of the mounted shelving. The bin rack workspace may, for example, accommodate different sizes and/or types of bins or tools.

The bin rack workspace may, for example, feature a bin rack rail/shelf combination. The bin rack workspace may, for example, have rails that are attached directly to the shelf above. This direct attachment method may, for example, streamline the assembly process.

The bin rack workspace may, for example, utilize a method where the bin rack rails attach directly to the underside of the shelf above. This method may, for example, eliminate the need for separate rail supports or brackets. The bin rack workspace may, for example, reduce the overall number of components required.

The bin rack workspace may, for example, achieve increased rigidity through this direct attachment of rails to shelves. The bin rack workspace may, for example, ensure a more stable and durable setup. The bin rack workspace may, for example, enhance the structural integrity of the entire unit.

FIGS. 14-18B depict some views of a small bin rack with suspended rails 1400. This rack may, for example, organize these bins in a configuration of three in a row and four in height, with two rows on shelving and two rows on suspended rails. The configuration may, for example, allow for the optimal use of vertical space while facilitating easy access to each bin.

In some implementations, the suspended rails of the small bin rack may, for example, be adjusted to accommodate different sized bins. These rails may, for example, be moved or repositioned to attach directly to the underside of standard wire shelves. This adjustability may, for example, provide versatility in the storage of various bin sizes, ensuring that the rack may meet diverse storage needs in different operational environments.

In some implementations, the small bin rack may, for example, include a truss-like structure to support the horizontal members. This structural configuration may, for example, prevent the horizontal members from buckling under the weight of the bins, which may weigh between 50 to 150 lbs in some cases. The truss-like structure may, for example, distribute the load evenly across the rack, enhancing the overall stability and durability of the storage system, ensuring it remains safe and functional under heavy load conditions.

Although various embodiments have been described with reference to the figures, other embodiments are possible.

Although an exemplary system has been described with reference to FIG. 1A-18B, other implementations may be deployed in other industrial, scientific, medical, commercial, and/or residential applications.

In industrial applications, the described vertical shelving unit with multiple vertical posts and horizontal support members may, for example, be used for robust storage solutions that may withstand the demanding conditions of warehouses, factories, and/or large-scale storage facilities. The configuration's ability to support heavy loads makes it ideal for storing large bins, tools, and/or machinery parts, optimizing space utilization and improving organization. The structural integrity provided by the truss-connected horizontal members ensures long-term durability and safety. This may, for example, maintain stability under a load.

In scientific environments such as laboratories and/or research facilities may benefit from the adaptable and secure storage solutions included by the vertical shelving unit embodiments. The adjustable dividers (e.g., such as suspended rail 1400) and back straps may, for example, ensure that sensitive equipment and specimens are held securely and are easily accessible, minimizing the risk of accidental spills or damage. The ability to customize the shelving configuration allows for efficient use of space in often constrained lab settings, facilitating better workflow and access to important research materials.

In medical applications, medical facilities, including hospitals and/or clinics, may deploy these shelving units for storing medical supplies, instruments, and medications. The shelving's sturdy construction ensures that it may safely bear the weight of medical equipment, while the horizontal back strap and adjustable dividers help keep items secure, reducing the risk of mishaps in fast-paced healthcare environments. The customizable nature of the shelving allows for tailored solutions to fit specific medical storage needs, enhancing operational efficiency.

In commercial applications such as retail stores and offices may utilize the vertical shelving unit to maximize floor space while displaying and organizing products and supplies. The aesthetic flexibility and functional configuration of the shelving make it suitable for both backroom storage and front-end product displays, accommodating a wide range of item sizes and shapes. The inclusion of features like plastic sliders and rails ensures that the shelving remains user-friendly and adaptable to the changing needs of a dynamic commercial environment.

In residential settings, the vertical shelving unit provides an effective solution for organizing and storing various household items, from garage tools and garden supplies to kitchenware and books. The ability to adjust shelf heights and configurations allows homeowners to customize the unit to suit their specific storage needs, making the most of available space in garages, basements, or living areas. The durable construction ensures that the shelving may, for example, withstand the wear and tear of daily use, offering a long-lasting storage solution for homes.

Some implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A vertical shelving unit comprising:
a plurality of vertical posts arranged to define a three-dimensional space and each extending longitudinally;
a plurality of bins disposed within the three-dimensional space and each comprising a lip;
a plurality of sets of transverse support members, the transverse support members of a support member set of the plurality of sets being coupled to at least some of the plurality of vertical posts on opposing sides of the three-dimensional space and extending towards each other into the three-dimensional space, defining a corresponding opening between the transverse support members of the support member set, wherein:
the plurality of bins are each suspended by their lip on an uppermost surface of and entirely by a corresponding set of the plurality of sets of transverse support members such that the plurality of bins are spatially distributed such that each bin is individually laterally translatable through the corresponding opening along the corresponding set within the three-dimensional space, and
the plurality of vertical posts are free of transverse support members between a top of at least one bin of the plurality of bins and a next upwards bin support, such that the at least one bin is translatable upwards.

2. The vertical shelving unit of claim 1, wherein each of the transverse support members comprises an upper horizontal member connected by a truss structure to a lower horizontal member.

3. The vertical shelving unit of claim 2, further comprising components coupled to at least one adjacent shelving unit.

4. The vertical shelving unit of claim 1, wherein each of the transverse support members is of a unitary construction.

5. The vertical shelving unit of claim 1, further comprising a desk situated between the plurality of vertical posts and a second plurality of vertical posts.

6. The vertical shelving unit of claim 1, further comprising an adjustable rail divider configured to be adjusted along a length of at least one set of support members.

7. The vertical shelving unit of claim 1, wherein the transverse support members comprise adjustment mechanisms on opposing ends, the adjustment mechanisms configured to be operated to adjust a position of the transverse support members relative to the plurality of vertical posts.

8. The vertical shelving unit of claim 1, wherein the support member set further comprises a transverse support member configured as a rack doubler and configured to extend across the three-dimensional space between a first transverse support member and a second transverse support member of the support member set such that:
a first bin is suspended entirely by: (a) the first transverse support member of the support member set on a first side of the first bin, and (b) the rack doubler on a second side of the first bin, and
a second bin is suspended entirely by the rack doubler on a first side of the second bin and by the second transverse support member of the support member set on a second side of the second bin.

9. The vertical shelving unit of claim 1, further configured to attach to an exterior surface such that the vertical shelving unit is prevented from tipping over when the plurality of bins are inserted.

10. The vertical shelving unit of claim 1, wherein at least one transverse support member of each of the plurality of sets of transverse support members is directly coupled to the plurality of vertical posts on the opposing sides of the three-dimensional space.

11. The vertical shelving unit of claim 10, further configured to be free of shelving traversing the three-dimensional space between at least two of the plurality of sets of transverse support members.

12. The vertical shelving unit of claim 1, wherein the lip, of a bin of the plurality of bins, extends laterally outward from an upper edge of the bin.

13. The vertical shelving unit of claim 12, wherein the plurality of bins further comprise lids.

14. The vertical shelving unit of claim 13, wherein the plurality of bins have solid walls.

15. The vertical shelving unit of claim 1, further comprising wheels and/or casters.

16. The vertical shelving unit of claim 1, further comprising a shelf comprising at least one of the plurality of sets of transverse support members.

17. The vertical shelving unit of claim 1, wherein each set of the plurality of sets of transverse support members comprises a maximum of two transverse support members.

18. The vertical shelving unit of claim 1, wherein the transverse support members of at least one of the plurality of sets of transverse support members extend, parallel to each other from a front of the three-dimensional space to a back of the three-dimensional space.

19. The vertical shelving unit of claim 1, wherein the plurality of vertical posts comprises at least four vertical posts defining the three-dimensional space and positioned at four corners of a rectangle.

20. The vertical shelving unit of claim 1, further comprising shelves in the three-dimensional space and/or additional vertical posts defining adjacent three-dimensional spaces.

21. The vertical shelving unit of claim 1, wherein the transverse support members of the plurality of sets of transverse support members each follow a curvilinear path extending into the three-dimensional space, away from the corresponding opening, and outward again.

22. The vertical shelving unit of claim 1, wherein the transverse support members are horizontal.

\* \* \* \* \*